US012757020B2

(12) United States Patent
Wang et al.

(10) Patent No.: US 12,757,020 B2
(45) Date of Patent: Oct. 6, 2026

(54) AUTHORIZATION OF APPLICATION FUNCTION FOR POLICY MANAGEMENT

(71) Applicant: INTERDIGITAL PATENT HOLDINGS, INC., Wilmington, DE (US)

(72) Inventors: Zhibi Wang, Woodridge, IL (US); Ulises Olvera-Hernandez, Saint-Lazare (CA); Alec Brusilovsky, Downingtown, PA (US); Jung Je Son, Warrington, PA (US); Morteza Kheirkhah, London (GB); Achref Methenni, Montreal (CA); Aneeqa Ijaz, Tulsa, OK (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 37 days.

(21) Appl. No.: 19/102,258

(22) PCT Filed: Aug. 7, 2023

(86) PCT No.: PCT/US2023/029608

§ 371 (c)(1),
(2) Date: Feb. 7, 2025

(87) PCT Pub. No.: WO2024/035629

PCT Pub. Date: Feb. 15, 2024

(65) Prior Publication Data

US 2026/0059314 A1 Feb. 26, 2026

Related U.S. Application Data

(60) Provisional application No. 63/501,548, filed on May 11, 2023, provisional application No. 63/396,438, filed on Aug. 9, 2022.

(51) Int. Cl.

*H04W 12/084* (2021.01)
*H04L 41/0894* (2022.01)

(Continued)

(52) U.S. Cl.

CPC ....... *H04W 12/084* (2021.01); *H04L 41/0894* (2022.05); *H04L 41/16* (2013.01);

(Continued)

(58) Field of Classification Search

CPC ............... H04W 12/084; H04W 12/61; H04W 28/24; H04W 24/02; H04L 41/0894; H04L 41/16; H04L 41/28

See application file for complete search history.

(56) References Cited

U.S. PATENT DOCUMENTS

| | | | | |
|---|---|---|---|---|
| 2013/0088983 A1* | 4/2013 | Pragada | H04W 24/08 370/252 |
| 2019/0182884 A1* | 6/2019 | Deenoo | H04W 16/28 |

(Continued)

FOREIGN PATENT DOCUMENTS

| | | | | |
|---|---|---|---|---|
| EP | 3863253 A1 | | 8/2021 | |
| ES | 2397824 T3 | * | 3/2013 | H04W 36/1443 |
| WO | WO-2023141167 A1 | * | 7/2023 | H04W 28/0268 |

OTHER PUBLICATIONS

Interdigital, "Solution Evaluation for AIML AF Authorization Policy Management," 3GPP TSG-SA3 Meeting #111, S3-232486, Berlin (May 22-26, 2023).

(Continued)

*Primary Examiner* — John B King
(74) *Attorney, Agent, or Firm* — Volpe Koenig

(57) ABSTRACT

An application function (AF) or network exposure function (NEF) requests authorization tokens to access policy control functions (PCF) from network repository function (NRF) for each AI/ML cycle, and receives a token that authorizes the AF to manage the quality of service (QoS) policy for the next AIML training cycle. Upon token validation, the AF sends a request to the NEF to reserve resources for an AF session. Upon authorization, the NEF sends a discovery request message to a binding support function (BSF) to (Continued)

discover PCFs serving WTRUs of an indicated group for the next AI/ML training cycle in the request from the AF. The BSF sends a discovery response to the NEF that comprises a list of the PCFs serving the identified WTRUs. The authorization tokens for PCF policy management on each PCF for the next AIML training cycle are then requested from the NRF.

20 Claims, 14 Drawing Sheets

(51) Int. Cl.
*H04L 41/16* (2022.01)
*H04L 41/28* (2022.01)
*H04W 12/61* (2021.01)
*H04W 28/24* (2009.01)

(52) U.S. Cl.
CPC ............ *H04L 41/28* (2013.01); *H04W 12/61* (2021.01); *H04W 28/24* (2013.01)

(56) References Cited

U.S. PATENT DOCUMENTS

| | | | | |
|---|---|---|---|---|
| 2022/0053476 | A1* | 2/2022 | Aksu | H04W 28/0215 |
| 2022/0095111 | A1 | 3/2022 | Fu et al. | |
| 2025/0071034 | A1* | 2/2025 | Wang | H04L 41/16 |
| 2025/0254512 | A1* | 8/2025 | Methenni | G06N 3/098 |
| 2025/0350383 | A1* | 11/2025 | Lutchoomun | H03M 13/612 |
| 2026/0012794 | A1* | 1/2026 | Zhang | H04W 12/30 |

OTHER PUBLICATIONS

Third Generation Partnership Project, "Technical Specification Group Services and System Aspects; Procedures for the 5G System (5GS); Stage 2 (Release 17)," 3GPP TS 23.502 V17.5.0 (Jun. 2022).
Third Generation Partnership Project, "Technical Specification Group Services and System Aspects; Procedures for the 5G System (5GS); Stage 2 (Release 18)," 3GPP TS 23.502 V18.2.0 (Jun. 2023).
Interdigital, "New Sol on Authorization of AF for Policy Management," 3GPP TSG-SA3 Meeting #110-adhoc-e, S3-231786, eMeeting (Apr. 17021, 2023).
Interdigital, "Solution of Trusted AF Authorization for Policy Management," 3GPP TSG-SA3 Meeting #111, S3-232485, Berlin (May 22-26, 2023).
Interdigital, "Solution of Untrusted AF Authorization for Policy Management," 3GPP TSG-SA3 Meeting #111, S3-232484, Berlin (May 22-26, 2023).
Third Generation Partnership Project, "Technical Specification Group Services and System Aspects; Security architecture and procedures for 56 system (Release 17)," 3GPP TS 33.501 V17.6.0 (Jun. 2022).
Third Generation Partnership Project, "Technical Specification Group Services and System Aspects; Security architecture and procedures for 56 system (Release 18)," 3GPP TS 33.501 V18.2.0 (Jun. 2023).
Third Generation Partnership Project, "Technical Specification Group Services and System Aspects; Study on 56 System Support for AI/ML-based Services (Release 18)," 3GPP TR 23.700-80 V18.0.0 (Dec. 2022).
Third Generation Partnership Project, "Technical Specification Group Services and System Aspects; Study on 56 System Support for AI/ML-based Services (Release 18)," 3GPP TR 23.700-80 V0.3.0 (May 2022).

* cited by examiner

AUTHORIZATION OF APPLICATION FUNCTION FOR POLICY MANAGEMENT

RELATED APPLICATIONS

This application is the U.S. National Stage, under 35 U.S.C. § 371, of International Application No. PCT/US2023/029608 filed Aug. 7, 2023, which claims the benefit of U.S. Provisional Application No. 63/396,438, filed Aug. 9, 2022, U.S. Provisional Application No. 63/501,548, filed May 11, 2023, the contents of which are incorporated herein by reference.

BACKGROUND

A Key Issue (KI) has been identified in 3GPP TR 23.700-80 V0.3.0, clause 5.7, that suggests that 3GPP 5G systems may be enhanced to assist collaborative application artificial intelligence machine learning (AIML) operations such as Federating Learning (FL) and Module distribution, in the execution of tasks, including FL member selection, group performance monitoring and allocation of adequate network resources. These enhancements are expected to benefit application AIML operations both at the Application Function (AF) (i.e., server side) and the UE (client side).

There have been several proposals to address the KI mentioned above, many of them suggesting solutions where the AF contacts the 5G system (5GS) to request assistance information (e.g. aggregated bit rate of a group of UE participating in an FL operation), for example in clause 6.37 of TR 23.700-80 V0.3.0, or the AF providing new or modified 5GS parameters (e.g. new parameters to enable reservation of resources specifically intended for a FL operations), for example in clause 6.42 of TR 23.700-80 V0.3.0.

A solution of FL operation support by 5GS based on AF session with required QoS provided by Application Server is provided in 3GPP TR 23.700-80 V0.3.0. clause 6.42 and listed below for reference. This solution maps to KI #7 and KI #6 described in clause 5.

Federated Learning between UE(s) and Application Function requires significant computation both on UE and AIML Application Function to execute one round/iteration of the FL task. For each iteration, the server selects FL members (UEs) that will participate in this iteration, perform relevant configuration, download the global model, and relevant model parameters and then wait for the UE(s) to report back with the updated local model. Only if enough UE(s) report back, the iteration will be considered successful else the iteration may be abandoned. Given this, to ensure most of the iterations are successful to in turn generate an optimum global model, i.e., to avoid straggling devices (devices that do not report back in time or do not respond to configuration requests from the server) it is beneficial if 5GS can expose relevant network status/information to aid the Application Function to select the FL members with the best chance (e.g., based on their reputation score) for a successful iteration. The selection of devices for a given iteration is in the scope of AF. However, the 5GS can aid the AF to make intelligent decisions (best chance for a successful iteration within a given period) regarding FL member selection.

The following is the assumption in this solution:—How the candidate list of UE(s) is selected to participate in each iteration of Federated Learning is in scope of the Application Function.

The following outlines the salient features of this solution: The AF sends a request to reserve resources for AF session to the NEF which includes AIML group information, AIML group performance information. The AIML group information consists of an External Group ID or list of candidate UEs selected by the AF to participate in an FL iteration, Area of Interest. The AIML group performance information includes Maximum latency for the AIML group, Maximum packet loss rate in UL, Maximum packet loss rate in DL, Duration for the requested QoS, and Minimum number of UEs in the AIML group. If multiple UE(s) from the AF group is served by the same PCF, the NEF may trigger a Npcf_GroupPolicyAuthorization_Create request towards the PCF with UE address(es), AF Identifier, Flow description(s), AIML Group performance information, AIML session indicator as input parameters. The NEF includes AIML session indicator if the Nnef_GroupAFsessionWithQoS_Create request in step 1 includes the AIML Group Performance container. If the PCF determines that the SMF serving the UE needs updated policy information, the PCF issues a Npcf_SMPolicyControl_UpdateNotify request with updated policy information about the PDU Session. The QoS flow binding shall ensure that, when the PCF provisions the PCC rule in SMF which contains the AIML group performance information and AIML session indicator, the PCC rule is bound to a new QoS Flow, and no other PCC rule is bound to this QoS Flow.

The procedure 200 for AF request for required QoS for the potential list of UE(s) that are selected by AF for participation in an iteration of Federated Learning is illustrated in FIG. 6.42.2-1 (FIG. 2).

1. The AF sends a request to reserve re resources for the AF session using Nnef_GroupAFsessionWithQoS_Create request message (AF Identifier, Flow description(s) or External Application Identifier, QoS reference, DNN, S-NSSAI, AIML group information, AIML group performance information) to the NEF. The AIML group information consists of External Group ID or a list of candidate UEs selected by the AF to participate in an FL iteration, Area of Interest. The AIML group performance information includes Minimum and Maximum latency for the AIML group, Minimum and Maximum packet loss rate in UL, Minimum and Maximum packet loss rate in DL, Duration for the requested QoS, and Minimum number of UEs in the AIML group. Maximum Requested bandwidth DL/UL is the maximum bandwidth in DL/UL for all the UEs included in the AIML group information. Maximum latency for the AIML group is the maximum reporting delay acceptable for all the UEs included in the AIML group information. The maximum packet loss rate in UL/DL is the maximum packet loss rate acceptable for all the UEs included in the ALML group information. Duration for the requested QoS is the time for which requested QoS is required for all the UEs included in the AIML group information. The minimum number of UEs in the AIML group indicates the minimum number of UEs for which the requested QoS can be provided for the list of UEs included in the AIML group information.
2. The NEF assigns a Transaction Reference ID to the Nnef_GroupAFsessionWithQoS_Create request. The NEF authorizes the AF request and may apply policies to control the overall amount of QoS authorized for the AF. If the authorization is not granted, the NEF replies to the AF with a Result value indicating that the authorization failed.
3. The NEF uses the External Group ID or list of UE addresses in step 1 to send a Nbsf_Management_Discovery request to BSF to discover the PCF(s) serving the UEs of the indicated group in the AF request. If the AF is considered to be trusted by the operator, the AF uses the Npcf_PolicyAuthorization_Create request message to interact directly with PCF(s) to request reserving resources for an AF session or sends a Nbsf_Management_Discovery request to BSF to discover the PCF(s) serving the UEs.

4. The BSF performs PCF discovery based on the input provided by the NEF in step 3.
5. The BSF sends a Nbsf_Management_Discovery response including the list of PCF(s) serving the UEs of the indicated in AIML group information provided by the AF. If the AF is trusted by the operator, the BSF sends a Nbsf_Management_Discovery response including the list of PCF(s) associated with the UEs of the AIML group provided by the AF, in which each PCF may be associated to different UEs of the indicated group.
6. If multiple UE(s) from the AF group is served by the same PCF, the NEF may trigger a Npcf_GroupPolicyAuthorization_Create request towards the PCF with UE address(es), AF Identifier, Flow description(s), AIML Group performance information, AIML session indicator as input parameters. The NEF includes the AIML session indicator if the Nnef_GroupAFsessionWithQoS_Create request in step 1 includes the AIML Group Performance container.
7. For a request received from the NEF in step 6, the PCF determines whether the request is authorized and notifies the NEF if the request is not authorized. If the request is authorized, PCF derives the required QoS parameters based on the information provided in the ALML group performance container and determines whether this QoS is allowed (according to the PCF configuration), and notifies the result to the NEF. When the PCF authorizes the service information from the AF, it generates a PCC rule by deriving the QoS parameters of the PCC rule based on the service information, AIML Group performance information, and also includes the AIML session indicator. If multiple UE(s) from the AF group is served by the same PCF, the PCF sends Npcf_GroupAuthorization_Create response with the result (success or failure) associated with the list of UEs for which policy authorization was successful and the reason for failure for the list of UEs for which policy authorization failed. If the AF is trusted by the operator, the PCF sends the Npcf_GroupPolicyAuthorization_Create response message directly to the AF. If the PCF determines that the SMF serving the UE needs updated policy information, the PCF issues a Npcf_SMPolicyControl_UpdateNotify request with updated policy information about the PDU Session. The QoS flow binding shall ensure that when the PCF provisions the PCC rule in SMF which contains the AIML group performance information and AIML session indicator, the PCC rule is bound to a new QoS Flow, and no other PCC rule is bound to this QoS Flow. Steps 6 and 7 are repeated for all the PCFs identified in step 5.
8. The NEF keeps track of the result included in step 7 from all the PCFs identified in step 5. If minimum UEs in the group with the requested QoS parameter are provided in step 1, and the results from all PCFs matches or exceeds the minimum UEs in the group with the requested QoS parameter, the NEF sends a Nnef_GroupAFsessionWithQoS_Create response message (Transaction Reference ID, Result, list of UEs in the AIML group for which the requested QoS is allowed) to the AF where the Result indicates that the request is granted. The UEs in the AIML group for which the QoS is allowed are included in the response only when the response from PCF(s) to NEF in step 7 indicates requested QoS for UE(s) is not allowed for all the UEs belonging to the AIML group provided as input in step 1.
9. The NEF shall send a Npcf_PolicyAuthorization_Subscribe message to the PCF(s) to subscribe to notifications of Resource allocation status. The PCF responds with a Subscription Correlation ID which allows the NEF to track all the subscription notifications unique to each UE in step 8.
10. When the event condition is met, e.g. the establishment of the transmission resources corresponding to the QoS update succeeded or failed, the QoS target can no longer be fulfilled, QoS monitoring parameters the PCF sends Npcf_PolicyAuthorization_Notify message to the NEF notifying about the event. The PCF includes the event information and Notification correlation information which identifies the AIML group AF session. If the operator trusts the AF, the PCF(s) sends the Npcf_PolicyAuthorization_Notify message directly to AF.
11. When the NEF receives the Npcf_PolicyAuthorization_Notify for all the UEs for the request granted in step 8, the NEF sends Nnef_GroupAFsessionWithQoS_Notify message with the event reported by the PCF(s) to the AF i.e. QoS resource allocated for all the UEs for which the request was granted in step 8 with the Transaction Reference ID.

The process described above lacks fine-grain authorization control: the NEF and/or AF can access all of the selected PCFs and/or corresponding UEs and/or obtain information about UE operations and parameters, resulting in potential security holes or insecure vectors for malicious attacks. In particular, the AF is given wide and pervasive access, which may not be appropriate in instances where the AF is untrusted or not under control of the system operator.

SUMMARY

For fine grain authorization, if an existing token can no longer be used for the authorization of a policy operation, the AF needs to contact the authorization server (i.e., a network repository function (NRF)), to get the authorization token on behalf of an untrusted AF to be used by the policy control functions (PCF(s)) to authorize the AF for the QoS policy management requests for each FL cycle. The token gives authorization of the AF to operate on (e.g. create, update, delete, read, etc.) the QoS policies at a specific PCF instance for a period of time that applies to a group of UEs.

A NEF may contact an authorization server (i.e., NRF) to get an authorization token on behalf of an untrusted AF to be used when requesting service access from the PCF(s). The PCF(s) may validate the token and may grant the AF the QoS policy management requests for each FL cycle, to authorize the AF to operate on (e.g. create, update, delete, read, etc.) the AIML QoS policies at specific PCF(s) for a period of time that applies to a group of UEs.

The authorization token should be fine grain controlled to include at least the home NRF FQDN (issuer), AF ID and UEs (subject), expected PCF service name(s) (scope), PCF instances involved in the FL cycle (additional scope), PCF FQDN (audience), expiration time (expiration), and the digital signature generated by the NRF. In this case, the AF needs to contact the binding support function (BSF) to discover the PCF instance(s) involved before contacting the NRF to request the authorization tokens for QoS policy operation at each PCF instance.

If the AF is considered trusted, the AF has an option to request for authorization a token for the PCF type NF (i.e., the token is valid for all PCF(s)). Alternatively, the AF may first contact the BSF to get the PCF instance(s), and then request the tokens for each PCF instance(s) from the NRF for authorization to be contacted by the AF in the FL cycle. The token(s) will be validated by the PCF instance(s) to authorize the AF for QoS policy operations in the FL cycle.

The methodology may be used for the operations from a third-party AF on other policies in the core network. The methodology may be used for the operations from a third-party AF on network resources in the core network other than operation authorization on policies.

The methodology may be used for both NF and UEs requesting access to other Network Functions, using service based interface (SBI) APIs, to request service authorization using a Service Authorization Token mechanism as specified in 3GPP TS 33.501 V17.6.0, clause 13.4.1.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
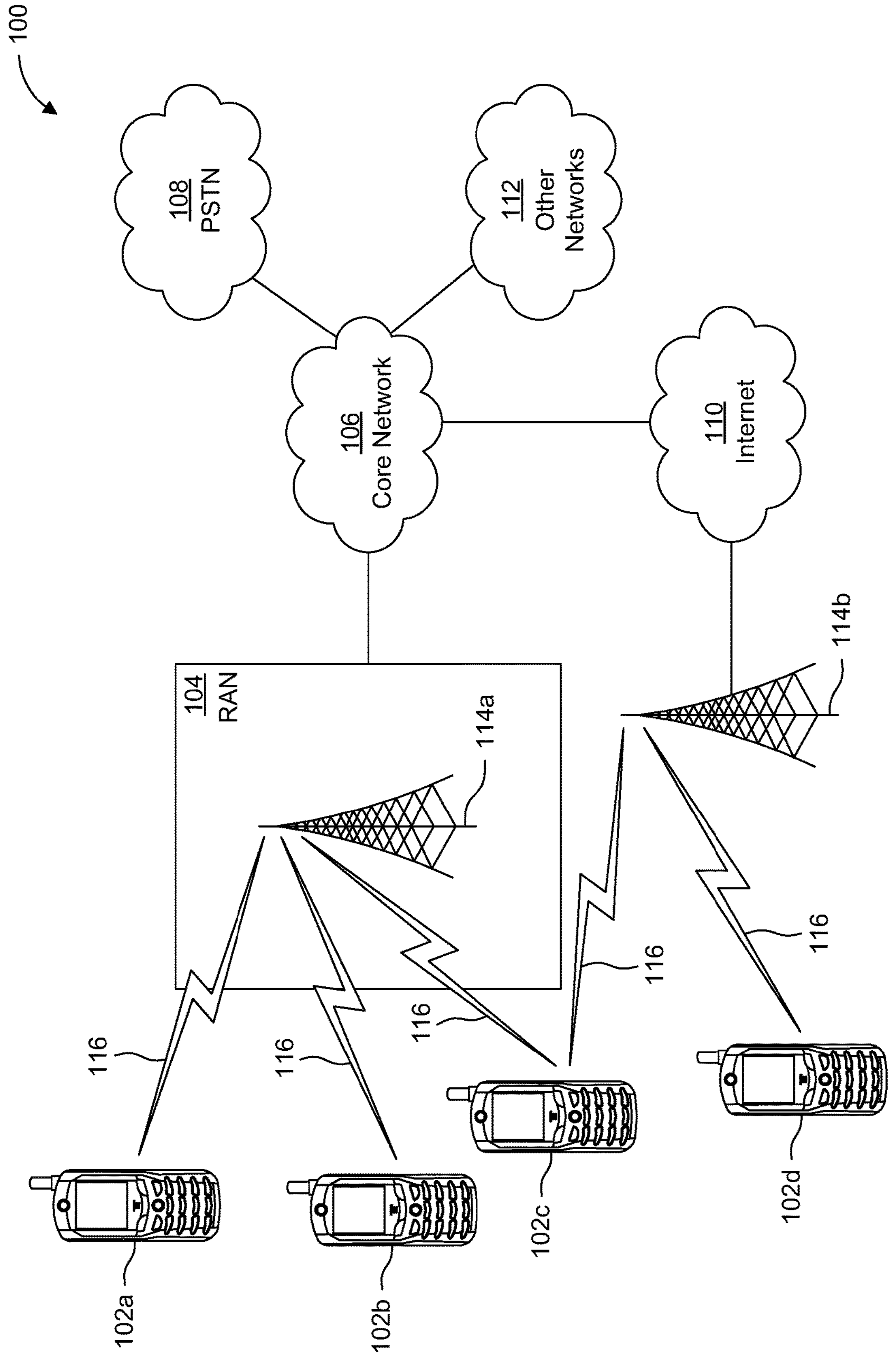
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VOIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
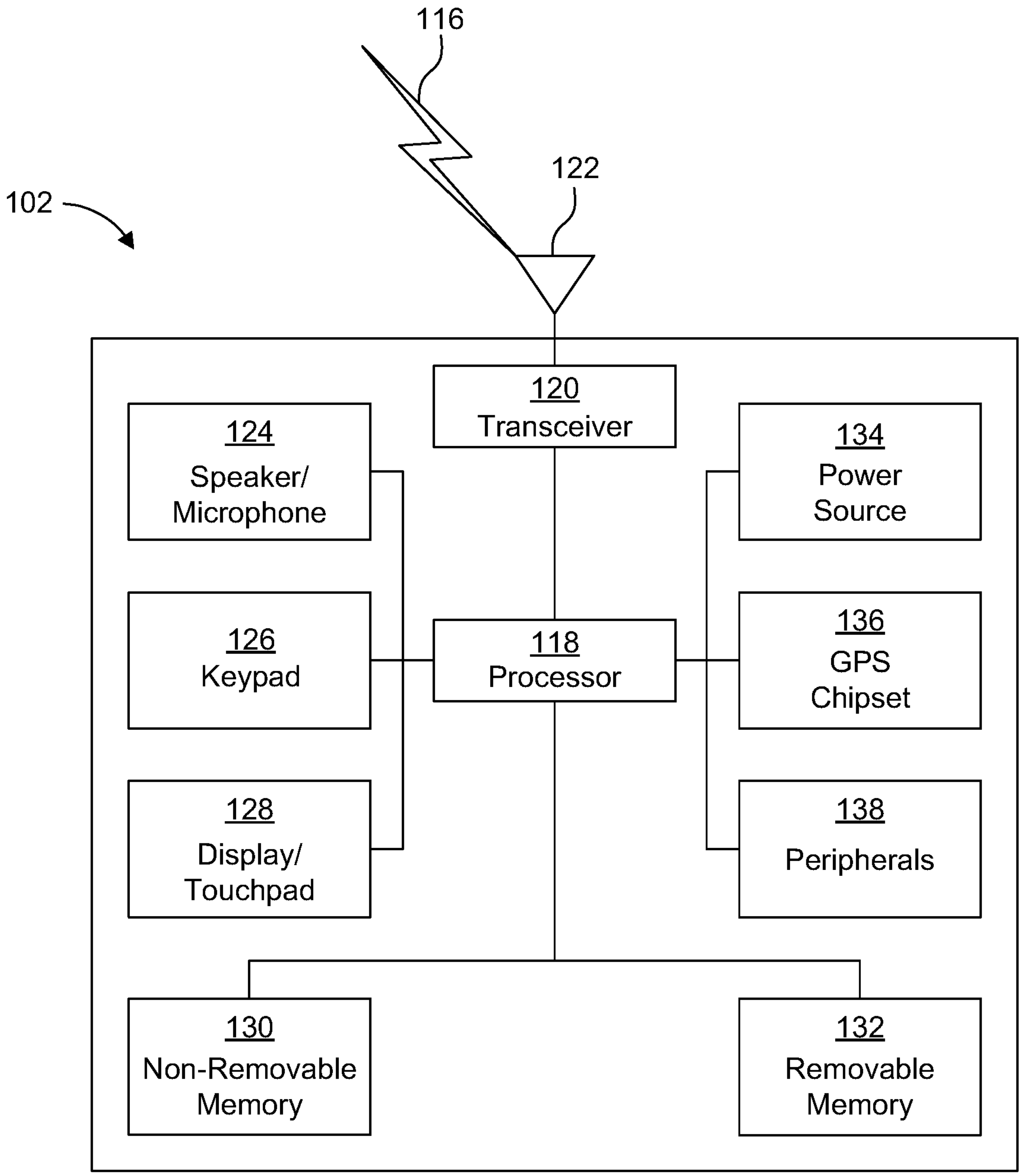
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
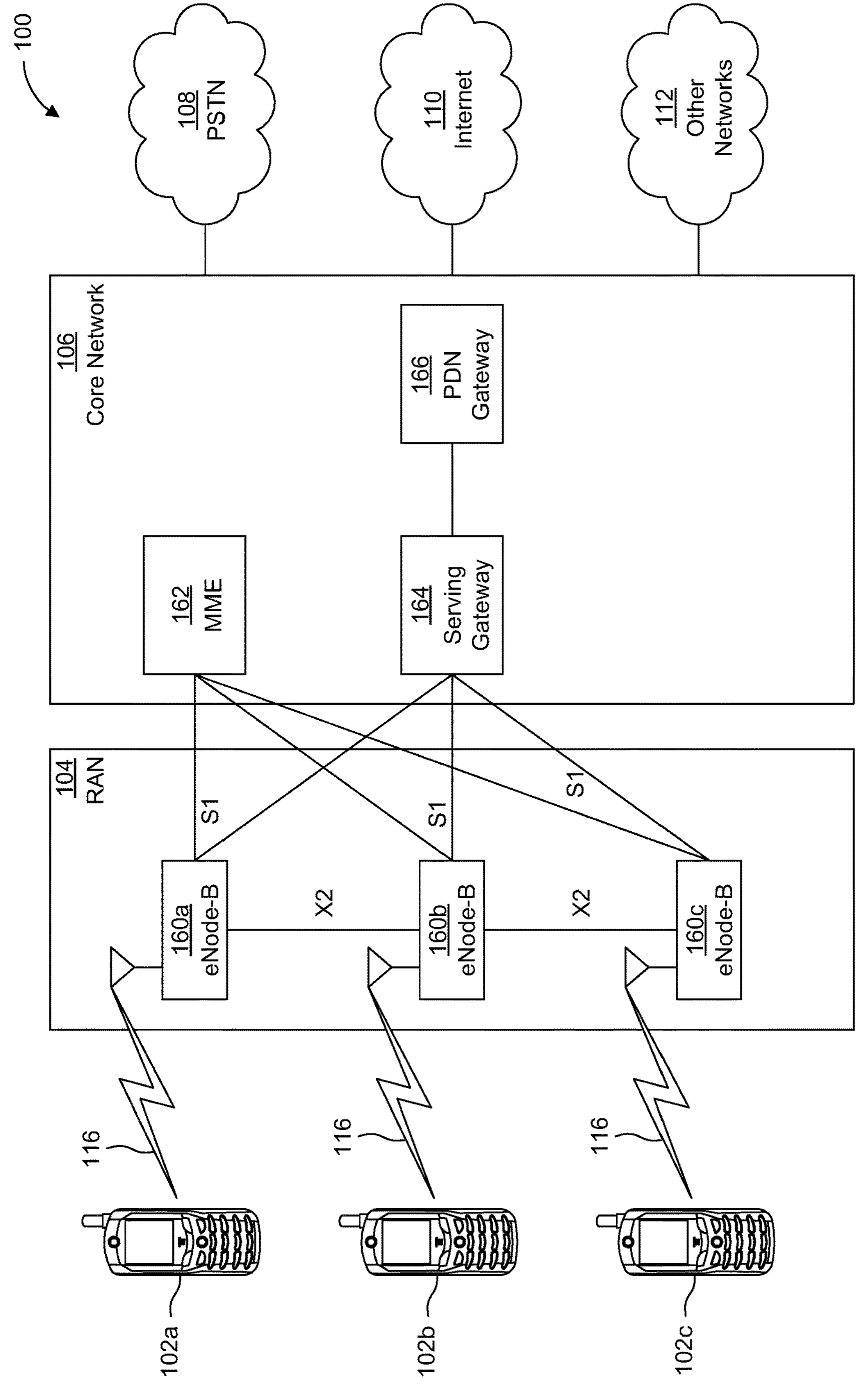
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
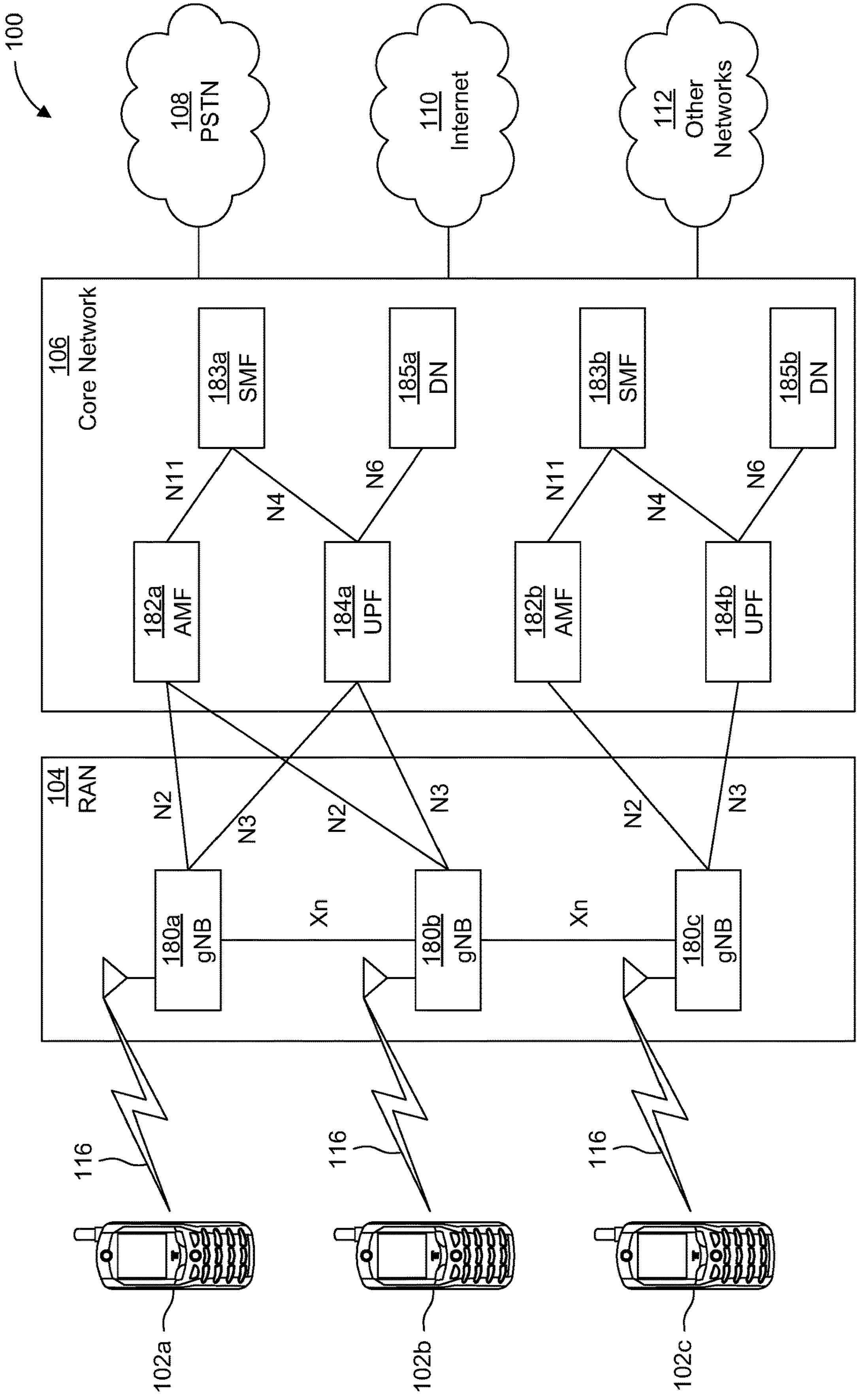
FIG. 1D is a system diagram illustrating a further example RAN and a further example CN that may be used within the communications system illustrated in FIG. 1A according to an embodiment.
Figure 2:
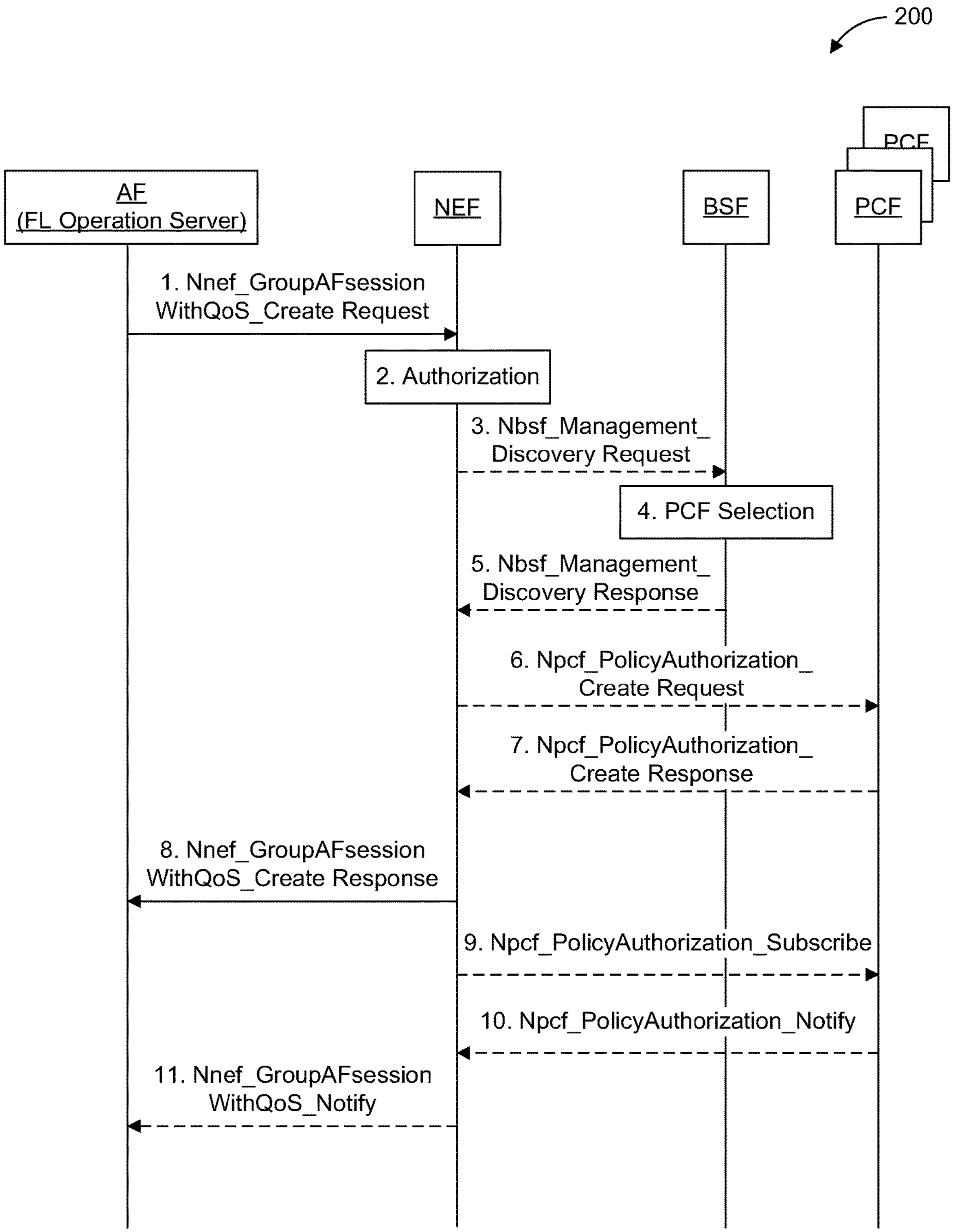
FIG. 2 shows a procedure for AF request for required QoS for the potential list of UE(s) that are selected by AF.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 3:
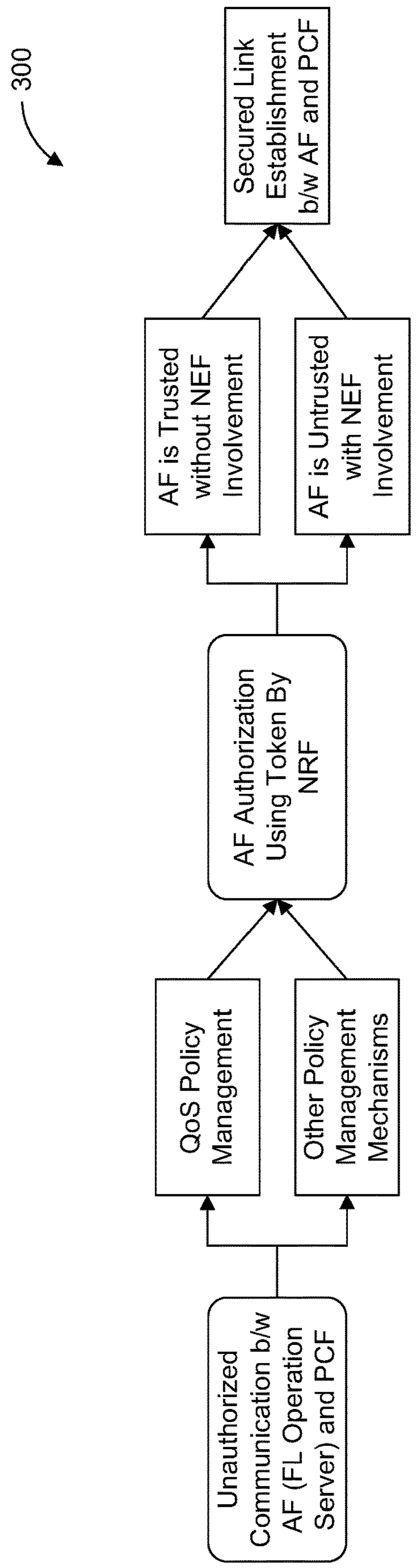
FIG. 3 shows an overview third-party AF authorization for network resource operation problem and possible solutions.

The following abbreviations and acronyms may be referred to:

AF Application Function
AIML Artificial Intelligence Machine Learning
DL Down Link
FL Federated Learning
NEF Network Exposure Function
NF Network Function
NRF Network Repository Function
NWDAF Network Data Analytics Function
OAM Operations, Administration and Maintenance
PCF Policy Control Function
PDU Packet Data Unit
QoS Quality of Service
SMF Session Management Function
SBI Service Based Interface
UE User Equipment
UL Upper Link
UPF User Plane Function FIG. 3 shows an overview 300 of a problem arising in third-party AF authorization for network resource operations and possible solutions.

According to the solution description #42 in 3GPP TR 23.700-80 V0.3.0, clause 6.42, when the AF is considered trusted, it will directly contact the PCF and BSF. In step 3, of this solution, the following text describing the AF behavior can be quoted: If the AF is considered to be trusted by the operator, the AF uses the Npcf_PolicyAuthorization_Create request message to interact directly with PCF(s) to request reserving resources for an AF session or sends a Nbsf_Management_Discovery request to BSF to discover the PCF(s) serving the UEs.

However, in some instances, a NF Service consumer that requests an access token from the NRF must provide a "scope" including (e.g. requested resources and actions on those resources, as well as other parameters).

UEs that participate in a previous cycle of FL may change due to many reasons, such as mobility, availability, coverage, battery power, or AF changes such as diversity of UE selection to cover more training parameter space, etc. When this happens, a UE set will be changed, and PCFs involved may be different from the previous cycle.

How often or frequent the authorization token should be shared or generated based on different set of UEs (subject), expected PCF service name(s) and instance(s) (scope and additional scope), PCF FQDN (audience), expiration time (expiration) may be different.

Some attempts at solutions assume that the authorization of AF should be performed once based on the policy, instead of for each FL cycle. However, a secure and flexible access control using a fine grain authorization token should be refreshed for each FL cycle because different set of UEs (subject), expected PCF service name(s) and PCF instance(s) (scope and additional scope), PCF FQDN (audience), expiration time (expiration) may be different.

The problems addressed by this disclose include: 1. How can service access authorization be performed when an AF executing a FL operation requests direct access to PCF/BSF, given that the scope described above, may change from FL cycle to FL cycle; and 2. How to fine grain access control by NF instances such as PCF instances from an untrusted AF with an authorization token issued by the NRF.

For fine grain authorization, if an existing token can no longer be used for the authorization of a policy operation, the AF needs to contact the authorization server (i.e., NRF), to get the authorization token on behalf of an untrusted AF to be used by the PCF(s) to authorize the AF for the QoS policy management requests for each FL cycle. The token gives authorization of the AF to operate on (e.g. create, update, delete, read, etc.) the QoS policies at a specific PCF instance for a period of time that applies to a group of UEs.

The authorization token should be fine grain controlled to include at least the home NRF FQDN (issuer), AF ID and UEs (subject), expected PCF service name(s) (Scope), PCF instance(s) involved in the FL cycle (additional scope), PCF FQDN (audience), expiration time (expiration), and the digital signature generated by the NRF. In this case, the AF needs to contact the BSF to discover the PCF instance(s) involved before contacting the NRF to request the authorization tokens for QoS policy operation at each PCF instance.

If the AF is considered trusted, the AF has an option to request for an authorization token for the PCF type NF (i.e., the token is valid for all PCF(s)). Alternatively, the AF may first contact the BSF to get the PCF instance(s), and then request the tokens for each PCF instance(s) from the NRF for authorization to be contacted by the AF in the FL cycle. The token(s) will be validated by the PCF instance(s) to authorize the AF for QoS policy operations in the FL cycle.

The methodology may be used for the operations from a third-party AF on other policies in the core network.

The methodology may be used for the operations from a third-party AF on network resources in the core network other than operation authorization on policies.

The methodology may be used for both NF and UEs requesting access to other Network Functions, using service based interface (SBI) APIs, to request service authorization using a Service Authorization Token mechanism.

In an embodiment, authorization of an untrusted AF using a token for policy management is disclosed.

Figure 4:
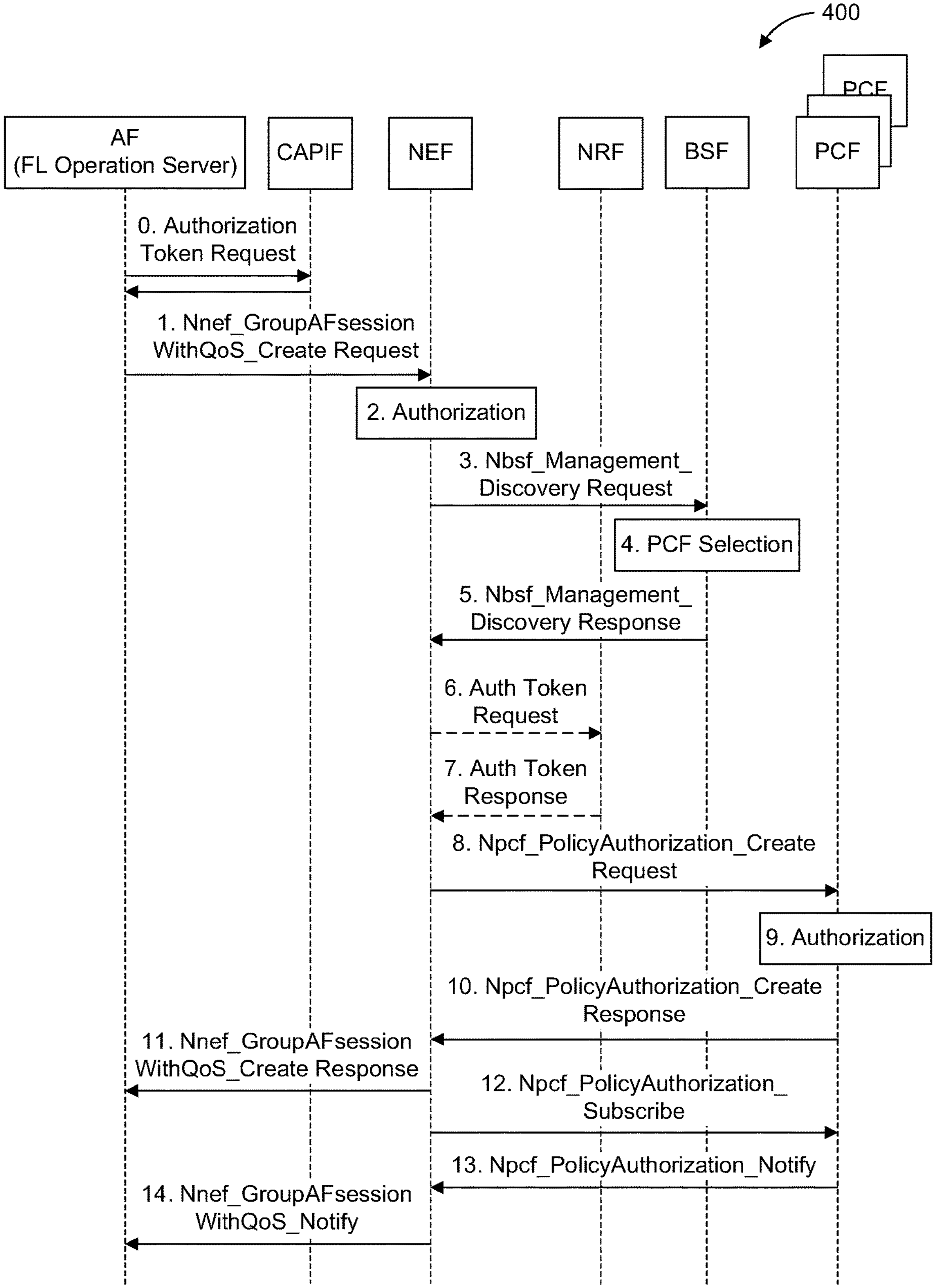
FIG. 4 shows an example procedure for AF request for required QoS for the potential list of UE(s) that are selected by the AF.

FIG. 4 shows an example procedure 400 for an AF request for required QoS for the potential list of UE(s) that are selected by the AF.

In step 0 of FIG. 4, the AF may request an authorization token from a common API framework (CAPIF) Core function. The CAPIF Core may serve as the authorization server. The AF is first authorized by the CAPIF that the AF is authorized to access the NEF. The authorization request may be made in any appropriate form (e.g. as an API request, a request in a management frame, a remote procedure call, a representational state transfer (RESTful) request, etc.). The authorization request may comprise an identifier such as an account identifier, password or code, or any other such information. The CAPIF may respond with an authorization token in any suitable format.

The token may be validated by the NEF (e.g. at step 2) to authorize the AF to manage the policy in the PCF. If the token authorizes the AF for policy management by the NEF on behalf of an AF on a PCF service type (i.e. for ALL the PCF(s), it may be used across multiple AIML FL cycles. In other embodiments, discussed in more detail below, the token may be limited in scope and/or time (e.g. with an associated expiration time, limited to a particular PCF service type or one or more PCFs, etc.).

In step 1 of FIG. 4, the AF may send a request to reserve resources for the AF session using a request message (e.g. a Nnef_GroupAFsessionWithQoS_Create request message) to the NEF. The request message may comprise, for example, authorization token(s), an AF Identifier, Flow description(s) or External Application Identifier, QoS reference, DNN, S-NSSAI, AIML group information, and/or AIML group performance information.

In step 2 of FIG. 4, the NEF may determine whether the authorization token from the CAPIF is valid, and may assign a Transaction Reference ID to the Nnef_GroupAFsessionWithQoS_Create request. The NEF may authorize the AF request and may apply policies to control the overall amount of QoS authorized for the AF. The NEF may alternatively authorize the AF request based on the token requested in step 0. If the authorization is not granted, the NEF may reply to the AF indicating that the authorization failed, for example by replying with a Result value.

In step 3 of FIG. 4, the NEF may use the External Group ID or list of UE addresses received in step 1 to send a discovery request message (e.g. a Nbsf_Management_Discovery request) to a BSF to discover the PCF(s) serving the UEs of the indicated group in the AF request.

In step 4 of FIG. 4, the BSF may perform a PCF discovery based on the input provided by the NEF in step 3. The BSF may determine which PCF(s) provide policy control for the corresponding UEs, which may be a subset of PCFs (e.g. because the corresponding UEs are a subset of UEs in the system).

In step 5 of FIG. 4, the BSF may send discovery response message (e.g. a Nbsf_Management_Discovery response) including the list of PCF(s) serving the UEs of the indicated AIML group information provided by the AF.

In step 6 of FIG. 4, if a fine grain control of authorization is needed, such as per-PCF based authorization, the NEF may request the PCF authorization token for the newly engaged PCF for this FL cycle. The authorization token may include an expiration time and/or date, and/or may specify which PCF the authorization corresponds to (e.g. by an identifier or address of the corresponding PCF).

In step 7 of FIG. 4, when the NEF received the authorization token from the NRF, in some embodiments, it may store the tokens locally or may store the tokens as the data subset of the application data at UDR on behalf of the AF for the future use. In other embodiments, the tokens may be forwarded to the AF or another device.

In step 8 of FIG. 4, if multiple UE(s) from the AF group is served by the same PCF, the NEF may trigger and send a Npcf_GroupPolicyAuthorization_Create request message towards the PCF with UE address(es), AF Identifier, Flow description(s), AIML Group performance information, and/ or AIML session indicator as input parameters. The NEF may include the AIML session indicator if the Nnef_GroupAFsessionWithQoS_Create request in step 1 includes the AIML Group Performance container along with authorization tokens for each PCF. Where UEs are served by difference PCFs, in some embodiments, the NEF may send a plurality of request messages (e.g. one to each PCF).

In step 9 of FIG. 4, for a request received from the NEF in step 8, each PCF receiving the request may determine whether the request is authorized (e.g. based on a token included with the request, via a backchannel communication to the NRF or BSF, or any other such authentication means) and may notify the NEF if the request is not authorized. If the request is authorized, the PCF may derive the required QoS parameters based on the information provided in the ALML group performance container and determine whether this QoS is allowed (e.g. according to the PCF configuration), and notify/send the result to the NEF. When the PCF authorizes the service information from the AF, it may generate a PCC rule by deriving the QoS parameters of the PCC rule based on the service information, AIML Group performance information, and also include the AIML session indicator.

In step 10 of FIG. 4, if multiple UE(s) from the AF group are served by the same PCF, the PCF may send a Npcf_GroupAuthorization_Create response with the result (e.g. success or failure) associated with the list of UEs for which policy authorization was successful and the reason for failure for the list of UEs for which policy authorization failed. If the PCF determines that the SMF serving the UE needs updated policy information, the PCF may issue/send a Npcf_SMPolicyControl_UpdateNotify request with updated policy information about the PDU Session. The QoS flow binding shall ensure that when the PCF provisions the PCC rule in the SMF which contains the AIML group performance information and AIML session indicator, the PCC rule is bound to a new QoS Flow, and no other PCC rule is bound to this QoS Flow. In instances were multiple PCFs serve different UEs from the AF group, step 10 may be performed by each PCF in parallel or serially.

In step 11 of FIG. 4, the NEF may keep track of the result included in step 7 from all the PCFs identified in step 5 in data subset of the application data at UDR. If minimum UEs in the group with the requested QoS parameter are provided in step 1, and the results from all PCFs match or exceed the minimum UEs in the group with the requested QoS parameter, the NEF may send a Nnef_GroupAFsessionWithQoS_Create response message (Transaction Reference ID, Result, list of UEs in the AIML group for which the requested QoS is allowed) to the AF where the Result indicates that the request is granted. The UEs in the AIML group for which the QoS is allowed are included in the response only when the response from the PCF(s) to the NEF in step 7 indicates requested QoS for UE(s) is not allowed for all the UEs belonging to the AIML group provided as input in step 1.

In step 12 of FIG. 4, the NEF may send a Npcf_PolicyAuthorization_Subscribe message to the PCF(s) to subscribe to notifications of Resource allocation status. Each PCF may respond with a Subscription Correlation ID which allows the NEF to track all the subscription notifications unique to each UE in step 8 (e.g. each correlation ID may be unique or semi-unique, such as unique to the session and/or tokens).

In step 13 of FIG. 4 when the event condition is met, for example the establishment of the transmission resources corresponding to the QoS update succeeded or failed, the QoS target can no longer be fulfilled, QoS monitoring parameters the PCF may send a Npcf_PolicyAuthorization_Notify message to the NEF notifying about the event. The PCF may include the event information and Notification correlation information which identifies the AIML group AF session.

In step 14 of FIG. 4, when the NEF receives the Npcf_PolicyAuthorization_Notify for all the UEs for the request granted in step 8, the NEF may send a Nnef_GroupAFsessionWithQoS_Notify message with the event reported by the PCF(s) to the AF i.e. QoS resource allocated for all the UEs for which the request was granted in step 8 with the Transaction Reference ID.

Figure 5:
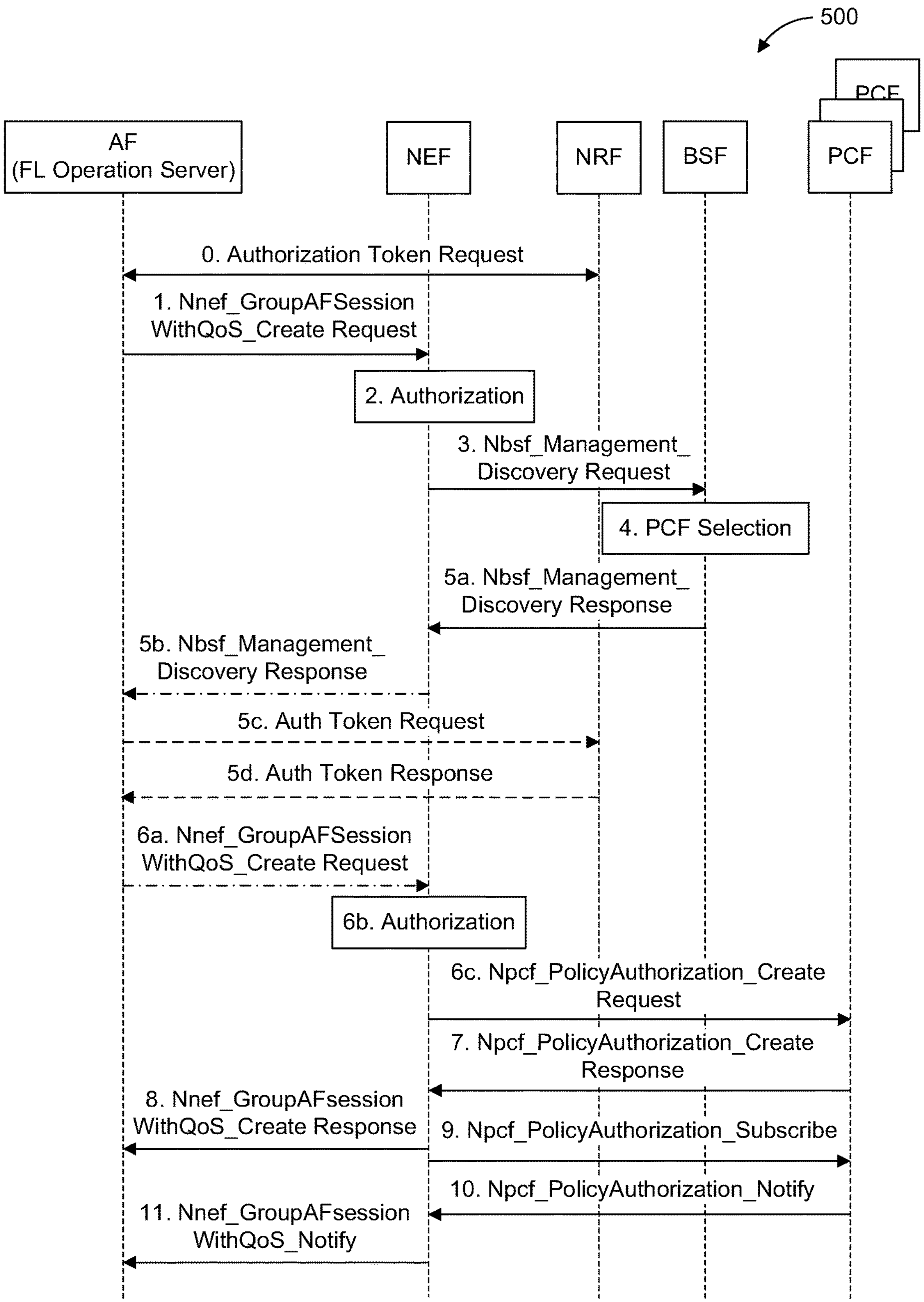
FIG. 5 shows an example procedure for AF request for required QoS for the potential list of UE(s) that are selected by the AF.

FIG. 5 shows another example procedure 500 for an AF request for required QoS for the potential list of UE(s) that are selected by the AF.

At step 0 of FIG. 5, the AF requests an authorization token from the NRF. The token may be used by the NEF to authorize the AF to manage the policy in the PCF. If the token authorizes the AF for policy management by the NEF on behalf of AF on PCF service type (i.e., for all the PCF(s), it may be used across multiple AIML FL cycles. If a fine grain control of authorization is necessary, such as per PCF instance based authorization, at step 5*c*, the AF may request an authorization token for each PCF based on the response from the BSF after step 5*a*, and send the request Nnef_GroupAFsessionWithQoS_Create in step 6*a*, as discussed below.

At step 1 of FIG. 5, the AF sends a request to reserve resources for the AF session using Nnef_GroupAFsessionWithQoS_Create request message (authorization token(s), AF Identifier, flow description(s) or External Application Identifier, QoS reference, DNN, S-NSSAI, AIML group information, AIML group performance information) to the NEF.

At step 2 of FIG. 5, the NEF assigns a Transaction Reference ID to the Nnef_GroupAFsessionWithQoS_Create request. The NEF authorizes the AF request and may apply policies to control the overall amount of QoS authorized for the AF. The NEF may alternatively authorize the AF request based on the token requested in step 0. If the authorization is not granted, the NEF replies to the AF with a result value indicating that the authorization failed.

At step 3 of FIG. 5, the NEF uses the External Group ID or list of UE addresses in step 1 to send a Nbsf_Management_Discovery request to the BSF to discover the PCF(s) serving the UEs of the indicated group in the AF request.

At step 4 of FIG. 5, the BSF performs PCF discovery based on the input provided by the NEF in step 3.

At step 5*a* of FIG. 5, the BSF sends a Nbsf_Management_Discovery response including the list of PCF(s) serving the UEs of the indicated in AIML group information provided by the AF.

At step 5*b* of FIG. 5, if a fine grain control of authorization is needed, such as per-PCF based authorization, the NEF forwards the discovered PCF(s) to the AF by forwarding the Nbsf_Management_Discovery response including the list of PCF(s) serving the UEs of the indicated in AIML group information provided by the AF.

At step 5*c* of FIG. 5, when a fine grain access control is needed for an untrusted AF, the AF requests the authorization token for policy operations in the PCF instance(s) for this FL cycle, including the list of PCF(s) associated with the UEs of the AIML group provided by the AF, in which each PCF may be associated to different UEs of the indicated group.

At step **5*d* of FIG. 5**, the AF receives the authorization token for the PCF instance(s) associated with the new FL cycle.

At step **6*a* of FIG. 5, if a fine grain control of authorization is necessary, such as per-PCF instance based authorization, the AF shall request an authorization token for each PCF using steps 5*b* and 5*c*. The AF sends the request Nnef_GroupAFsessionWithQoS_Create as an alternative step of step 1**. The AF sends a request to reserve resources for the AF session using Nnef_GroupAFsessionWithQoS_Create request message (tokens for each PCF, AF Identifier, Flow description(s) or External Application Identifier, QoS reference, DNN, S-NSSAI, AIML group information, AIML group performance information) to the NEF.

At step **6*b* of FIG. 5**, the NEF authorizes the AF request and validates the QoS authorization for each PCF based on authorization tokens for each PCF instance. If the authorization is not granted, the NEF replies to the AF with a result value indicating that the authorization failed.

At step **6*c* of FIG. 5, ff multiple UE(s) from the AF group is served by the same PCF, the NEF may trigger a Npcf_GroupPolicyAuthorization_Create request towards the PCF with UE address(es), AF Identifier, Flow description(s), AIML Group performance information, AIML session indicator as input parameters. The NEF includes the AIML session indicator if the Nnef_GroupAFsessionWithQoS_Create request in step 1** includes the AIML Group Performance container.

At step 7 of FIG. 5, for a request received from the NEF in step 6, the PCF determines whether the request is authorized and notifies the NEF if the request is not authorized. If the request is authorized, the PCF derives the required QoS parameters based on the information provided in the ALML group performance container and determines whether this QoS is allowed (according to the PCF configuration), and notifies the result to the NEF. When the PCF authorizes the service information from the AF, it generates a PCC rule by deriving the QoS parameters of the PCC rule based on the service information, AIML Group performance information, and also includes the AIML session indicator. If multiple UE(s) from the AF group is served by the same PCF, the PCF sends a Npcf_GroupAuthorization_Create response with the result (i.e. success or failure) associated with the list of UEs for which policy authorization was successful and the reason for failure for the list of UEs for which policy authorization failed. If the PCF determines that the SMF serving the UE needs updated policy information, the PCF issues a Npcf_SMPolicyControl_UpdateNotify request with updated policy information about the PDU Session. The QoS flow binding shall ensure that when the PCF provisions the PCC rule in SMF which contains the AIML group performance information and AIML session indicator, the PCC rule is bound to a new QoS Flow, and no other PCC rule is bound to this QoS Flow.

In step 8 of FIG. 5, the NEF keeps track of the result included in step 7 from all the PCFs identified in step 5. If a minimum UEs in the group with the requested QoS parameter are provided in step 1, and the results from all PCFs matches or exceeds the minimum UEs in the group with the requested QoS parameter, the NEF sends a Nnef_GroupAFsessionWithQoS_Create response message (Transaction Reference ID, Result, list of UEs in the AIML group for which the requested QoS is allowed) to the AF where the result indicates that the request is granted. The UEs in the AIML group for which the QoS is allowed are included in the response only when the response from the PCF(s) to NEF in step 7 indicates requested QoS for UE(s) is not allowed for all the UEs belonging to the AIML group provided as input in step 1.

In step 9 of FIG. 5, the NEF shall send a Npcf_PolicyAuthorization_Subscribe message to the PCF(s) to subscribe to notifications of Resource allocation status. The PCF responds with a Subscription Correlation ID which allows the NEF to track all the subscription notifications unique to each UE in step 8.

In step 10 of FIG. 5, when the event condition is met (e.g. the establishment of the transmission resources corresponding to the QoS update succeeded or failed), the QoS target can no longer be fulfilled, QoS monitoring parameters the PCF sends a Npcf_PolicyAuthorization_Notify message to the NEF notifying about the event. The PCF includes the event information and notification correlation information which identifies the AIML group AF session.

In step 11 of FIG. 5, when the NEF receives the Npcf_PolicyAuthorization_Notify for all the UEs for the request granted in step 8, the NEF sends Nnef_GroupAFsessionWithQoS_Notify message with the event reported by the PCF(s) to the AF (i.e. QoS resource allocated for all the UEs for which the request was granted in step 8 with the Transaction Reference ID).

In an embodiment, authorization of an trusted AF using a token for policy management is disclosed.

Figure 6:
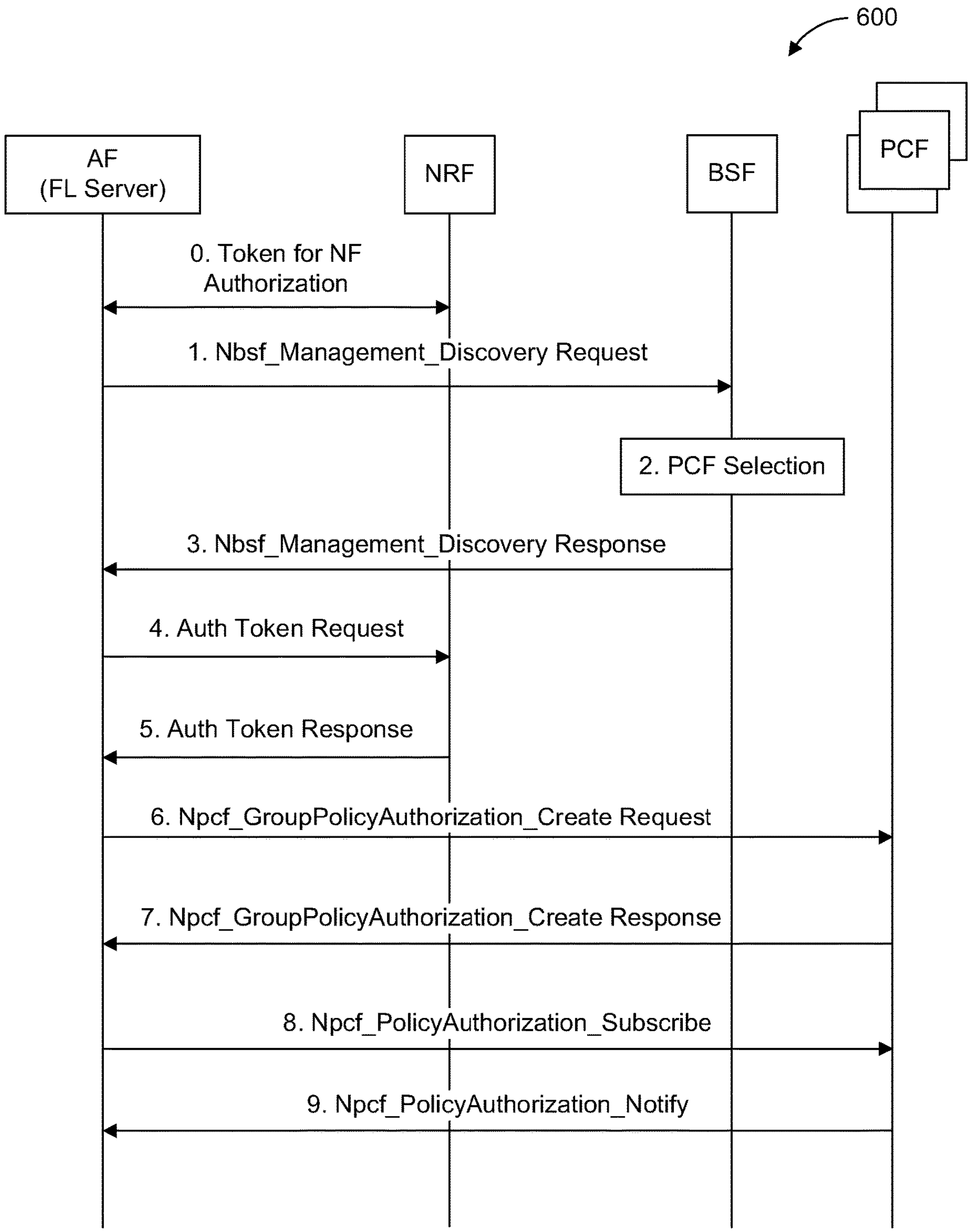
FIG. 6 shows an example procedure for a trusted AF request for required QoS for the potential list of UE(s) that are selected by the AF.

FIG. 6 shows an example procedure 600 for a trusted AF request for required QoS for the potential list of UE(s) that are selected by the AF.

In step 0 of FIG. 6, the trusted AF requests the authorization token from the NRF. The token may be used by the PCF to authorize the AF to manage the policy. If the token authorizes the AF for policy management by all the PCF(s), it may be used across multiple AIML FL cycles. If a fine grain control of authorization is necessary, such as per-PCF based authorization, the AF shall request an authorization token for each PCF based on the response from the BSF after step 5, and sends the request Nnef_GroupAFsessionWithQoS_Create in step 6, discussed below.

In step 1 of FIG. 6, the AF sends a Nbsf_Management_Discovery request to the BSF to discover the PCF(s) serving the UEs.

In step 2 of FIG. 6, the BSF performs PCF discovery based on the input provided by the AF in step 1.

In step 3 of FIG. 6, the BSF sends a Nbsf_Management_Discovery response including the list of PCF(s) serving the UEs of the indicated in AIML group information provided by the AF. For the trusted AF by the operator, the BSF sends a Nbsf_Management_Discovery response including the list of PCF(s) associated with the UEs of the AIML group provided by the AF, in which each PCF may be associated to different UEs of the indicated group.

In step 4 of FIG. 6, the AF is trusted by the operator and the AF may alternatively request the authorization token for policy operations in the PCF instance(s) for this FL cycle, including the list of PCF(s) associated with the UEs of the AIML group provided by the AF, in which each PCF may be associated to different UEs of the indicated group.

In step 5 of FIG. 6, the AF receives the authorization token for the PCF(s) associated with the new FL cycle.

In step 6 of FIG. 6, the AF is trusted by the operator and the AF sends a Npcf_GroupPolicyAuthorization_Create request towards PCF with authorization token received in step 0 that is valid for the PCF type (i.e., valid for all PCF instance) or token that is requested in the step 4 and 5 for specific PCF instance(s) for this FL cycle, UE address(es), AF Identifier, Flow description(s), AIML Group performance information, AIML session indicator as input parameters. The PCF validates the authorization token before processing the request.

In step 7 of FIG. 6, for a request received from the AF in step 6, the PCF determines whether the request is authorized and notifies the AF if the request is not authorized. If the request is authorized, PCF derives the required QoS parameters based on the information provided in the ALML group performance container and determines whether this QoS is allowed (according to the PCF configuration), and notifies the result to the AF. When the PCF authorizes the service information from the AF, it generates a PCC rule by deriving the QoS parameters of the PCC rule based on the service information, AIML Group performance information, and also includes the AIML session indicator. If multiple UE(s) from the AF group is served by the same PCF, the PCF sends Npcf_GroupPolicyAuthorization_Create response with the result (i.e. success or failure) associated with the list of UEs for which policy authorization was successful and the reason for failure for the list of UEs for which policy authorization failed. If the PCF determines that the SMF serving the UE needs updated policy information, the PCF issues a Npcf_SMPolicyControl_UpdateNotify request with updated policy information about the PDU Session. The QoS flow binding shall ensure that when the PCF provisions the PCC rule in SMF which contains the AIML group performance information and AIML session indicator, the PCC rule is bound to a new QoS Flow, and no other PCC rule is bound to this QoS Flow. Steps 6 and 7 are repeated for all the PCFs identified.

In step 8 of FIG. 6, for the trusted AF, the PCF(s) sends the Npcf_PolicyAuthorization_Subscribe message directly to PCF(s) to subscribe to notifications of Resource allocation status with an authorization token for an associated PCF. After validating the authorization token, each PCF responds with a Subscription Correlation ID.

In step 9 of FIG. 6, when the event condition is met (e.g. the establishment of the transmission resources corresponding to the QoS update succeeded or failed, the QoS target can no longer be fulfilled, QoS monitoring parameters) the PCF sends a Npcf_PolicyAuthorization_Notify message to the trusted AF notifying about the event. The PCF includes the event information and Notification correlation information which identifies the AIML group AF session.

Although the embodiments above in previous clause focuses on the QoS policy management by the PCF, the same mechanism may be used for other policy management such security policies, routing policies (URSP), and etc. in the PCF.

In an embodiment, to support fine grain token management, the token attributes may include a time window (in other terms a start time and a stop time) in addition to the expiration time mentioned previously.

For example, a network function, such as an AF may request to access some network resources (e.g., certain invoking some APIs) sometime in the future. In this case, the AF does not need the authorization to be granted for immediate use, but for future use at a certain start time. In this scenario an expiration timer for the token validity will only begin to decrease when the start time arrives, instead of starting immediately after the response from the authorization server (e.g., NRF) is generated. This will allow another aspect of fine grain for the token management.

In an example, an expiration timer will start to decrease only when the network function (e.g., AF) begins to use the token (e.g., by using the token to invoke a certain API).

In this embodiment, we will focus on negotiating background data transfer and show how the new time dependent token aspect may be used for fine grain for authorization of AF for BDT policy management.

The AF may contact the PCF via the NEF or directly contact the PCF if the AF is trusted as detailed in the first embodiment to request a time window and related conditions for future background data transfer (BDT).

Later, before the start of the BDT transfer window, the AF may initiate the activation of the negotiated future PDU sessions based on the previously negotiated BDT policy by invoking NEF APIs such Nnef_ApplyPolicy_Create service to contact the PCF. The PCF may use the negotiated BDT policy and create new PCC rules to accommodate the BDT traffic (e.g., by establishing a new PDU session).

In this embodiment, if the negotiation is successful, the authorization server (i.e., NRF) generates a token for future use to allow the AF to use for example APIs Nnef_ApplyPolicy_Create at the time of the start of the BDT session.

In certain scenarios, such as when the network performance changes (e.g., network performance degradation), the 5GS may re-negotiate with the AF the BDT policies, if possible. In this case, the 5GS may update the BDT policies, or may cancel the BDT future session.

We propose that, if the 5GS updates the BDT policies, the authorization server (i.e., NRF) may update the authorization token for the future BDT session requests (e.g., invoking NEF API Nnef_ApplyPolicy_Create). For example, the NRF may change the start time or stop time attributes of the token. If the BDT session is cancelled, the authorization server may revoke the authorization token.

Figure 7:
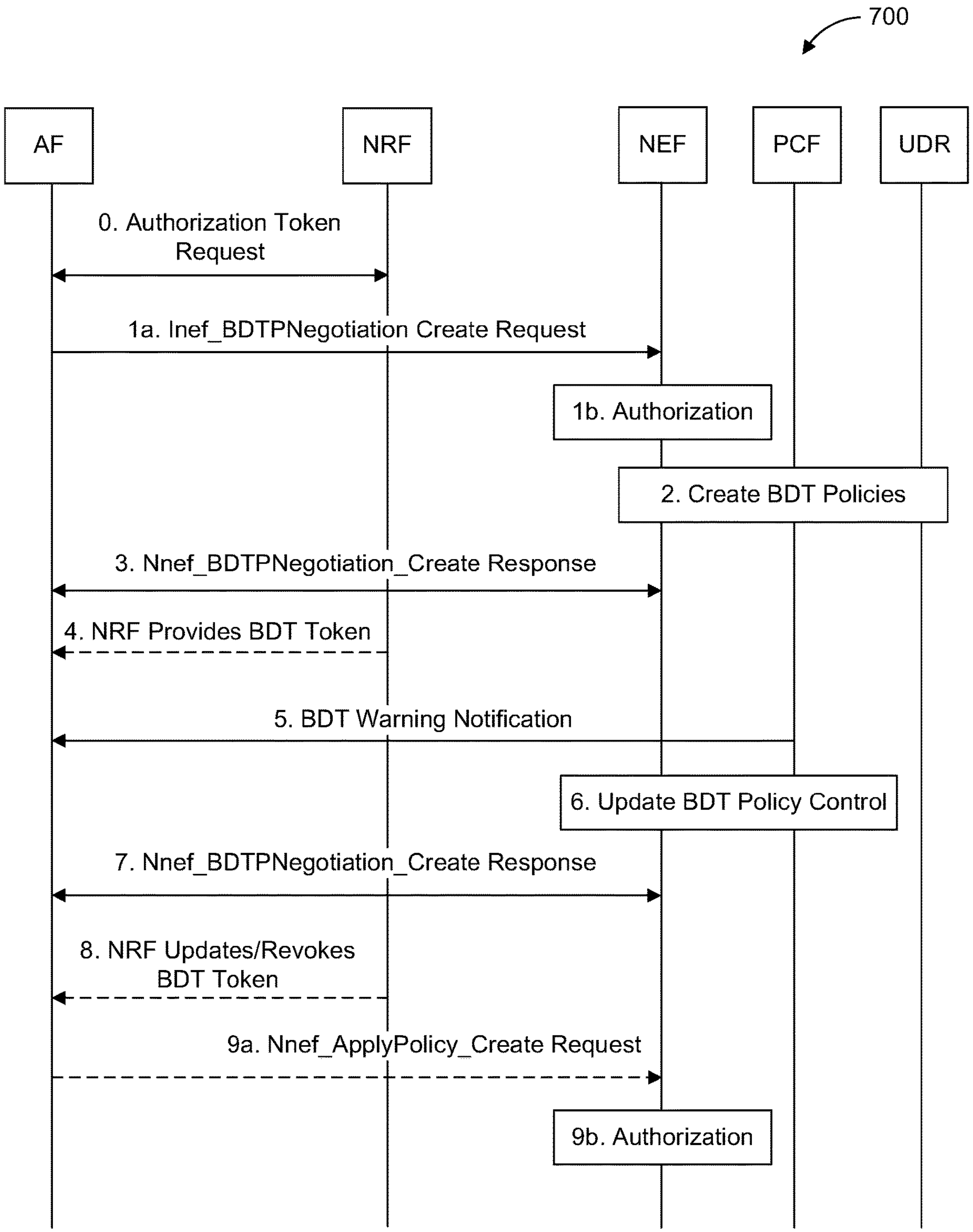
FIG. 7 shows an example procedure for a BDT session negotiation and AF authorization with time-dependent tokens.

FIG. 7 shows an example procedure 700 for a BDT session negotiation and AF authorization with time-dependent token.

The procedures shown in FIG. 7 support negotiation for future background data transfer. In FIG. 7, we assume one PCF is used to support the BDT session.

In step 0 of FIG. 7, the AF request the authorization token from the NRF. This token may be used by the NEF to authorize the AF to request a BDT related policy.

In step 1*a* of FIG. 7, the AF invokes the Nnef_BDTPNegotiation_create with attributes (e.g. ASP ID, number of UEs, desired time window volume per UE, request for notification) to provide BDT session information.

In step 1*b* of FIG. 7, the NEF validates the authorization token provided by the AF.

Step 2 of FIG. 7 represents steps 2-10 in procedure 4.16.7.2 in 23.502, where the NEF forwards the AF request to the PCF, the PCF retrieves data from the UDR regarding the UE, and the PCF makes a policy decision and send a response to the NEF. If the AF is trusted, the AF contacts the PCF directly along with the authorization token requested from the NRF.

In step 3 of FIG. 7, the NEF sends a Nnef_BDTPNegotiation_Create response to the AF to provide one or more background data transfer policies and a BDT reference ID to the AF. The AF then selects the BDT policy to be used in the future. Then NEF acknowledges the AF message.

In step 4 of FIG. 7, after successful BDT negotiation between the PCF and AF, the authorization server (i.e., NRF) generates a time dependent access token for future use for a BDT purpose (for example having a start time similar to the start time of the BDT session) where the AF may invoke services such as Nnef_ApplyPolicy_Create. Later, the AF does not need to request an authorization token to invoke this API for this purpose.

Step 5 of FIG. 7 represents the case where the BDT agreement might need to change. For example, if network conditions change, and the future BDT session policies may need to be updated. In step 5, the steps 2-11 in clause 4.16.7.3 in 23.502 for BDT warning notification are performed. The PCF, once being aware that network performance is degraded, starts to re-establish new BDT policies to be renegotiated. Then PCF then sends the new policies to the AF through the NEF, or directly to the AF if it is trusted. Afterwards, the AF selects the new BDT policy to use.

In step 6 of FIG. 7, once the AF sends the selected BDT policy to the PCF, the PCF updates the BDT policy.

In step 7 of FIG. 7, the NEF sends a Nnef_BDTPNEgotiation_Create response to the AF to provide one or more background data transfer policies and a BDT reference ID to the AF. The AF then selects the BDT policy to be used in the future. Then NEF acknowledges the AF message. If the AF is trusted, the PCF can directly communicate with the AF to update the BDT policy without going through the NEF in steps 6 and 7.

In step 8 of FIG. 7, once the new BDT policy is successfully updated, the authorization server will generate a new authorization time dependent token for a future BDT session (with the new time window similar to the updated BDT policy) and provide it to the AF.

In step 9*a* of FIG. 7, when the BDT session is about to start, the AF invokes API Nnef_ApplyPolicy_Create using the authorization token provided previously by the NRF. The NEF validates the token (for example, the time window for token is still valid) in 9*b*, and forwards the request to the PCF. If the AF is trusted, the AF directly communicates with the PCF.

A same mechanism in the embodiments of FIGS. 5 and 6 may be used for AF authorization when a third-party AF is considered trusted to access core network functionalities/resources other than going through the NEF for the policy management by the PCF.

In some implementations, both the UE and the AF may request 5GS performance metrics, predictions, and statistics. This means that it is conceivable for a UE to take the role of a NF and use mechanisms as those described above.

Figure 8:
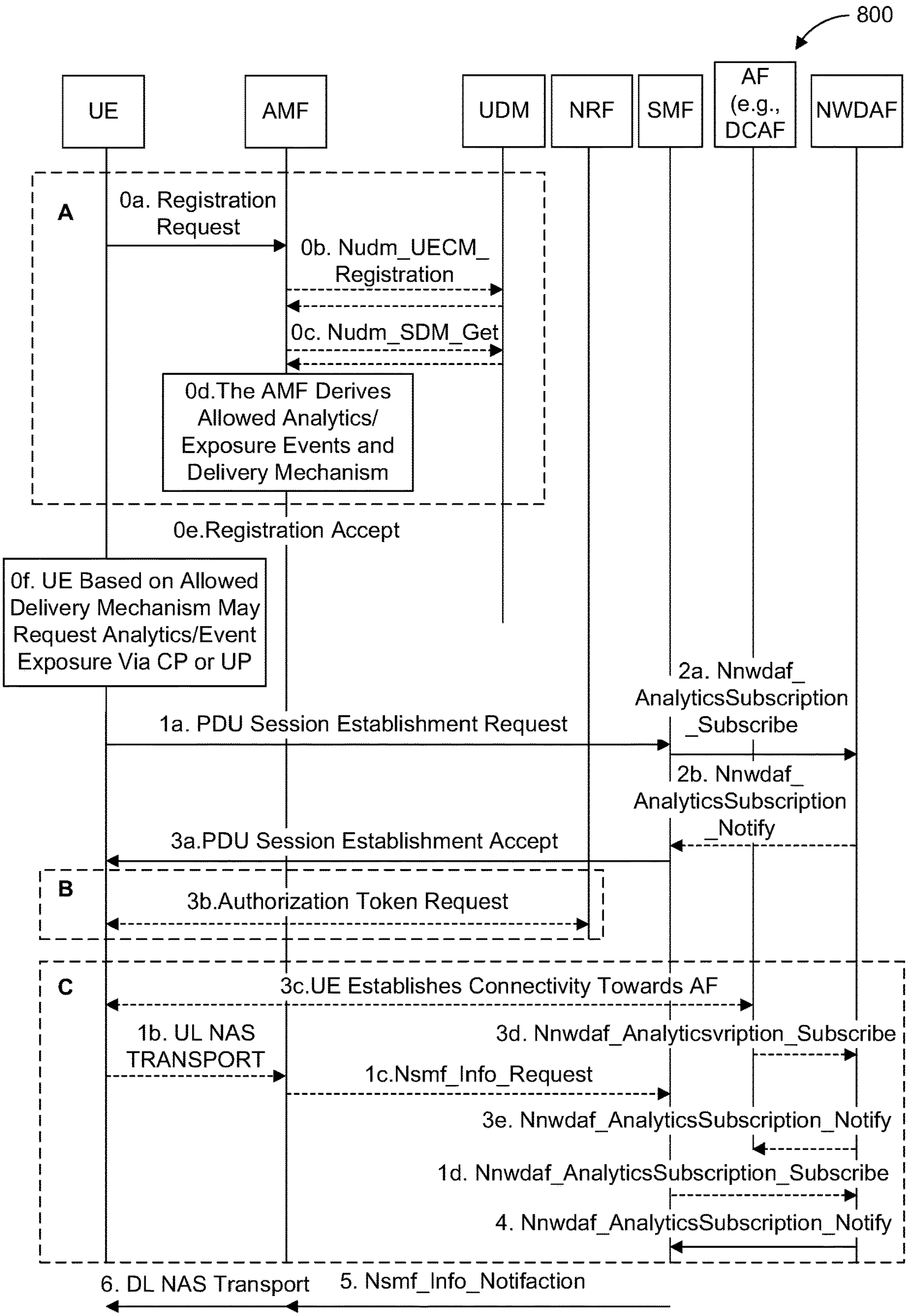
FIG. 8 shows an example procedure for a UE acting as a NF and requesting Service Access Authorization from a NRF.

FIG. 8 shows an example procedure 800 for a UE acting as a NF and requesting Service Access Authorization from a NRF.

In this alternative, the UE is taking the role of a NF and gets an access token from the NRF (option B of FIG. 8) and it uses it to access the NF directly (e.g. the UE may use the access token to access the NWDAF directly via an established PDU Session (i.e., over the user plane)).

The UE may use NAS transport mechanisms to carry an HTTP message towards the relevant NFs (e.g., the UE may use UL NAS transport and then have the AMF relay the Nndwdaf_AnalyticsSubscription_Subscribe message towards the NDWDAF directly).

Steps 0*a*-3*a* in FIG. 8 are performed as in 3GPP TR 23.700-80 V0.3.0, clause 6.5.

In step 3*b* of FIG. 8, the UE requests from the NRF a service authorization token by using the "scope" and "additional scope" information (e.g., requested resources and requested actions or service operations expected from the NF it wants to contact). The UE may also provide information regarding the validity of the service operation within a time window, and whether the UE requested resources the service operation acts upon, are expected to change in time.

Step 3*c*-6 in FIG. 8 are performed as in 3GPP TR 23.700-80 V0.3.0, clause 6.5.

Figure 9:
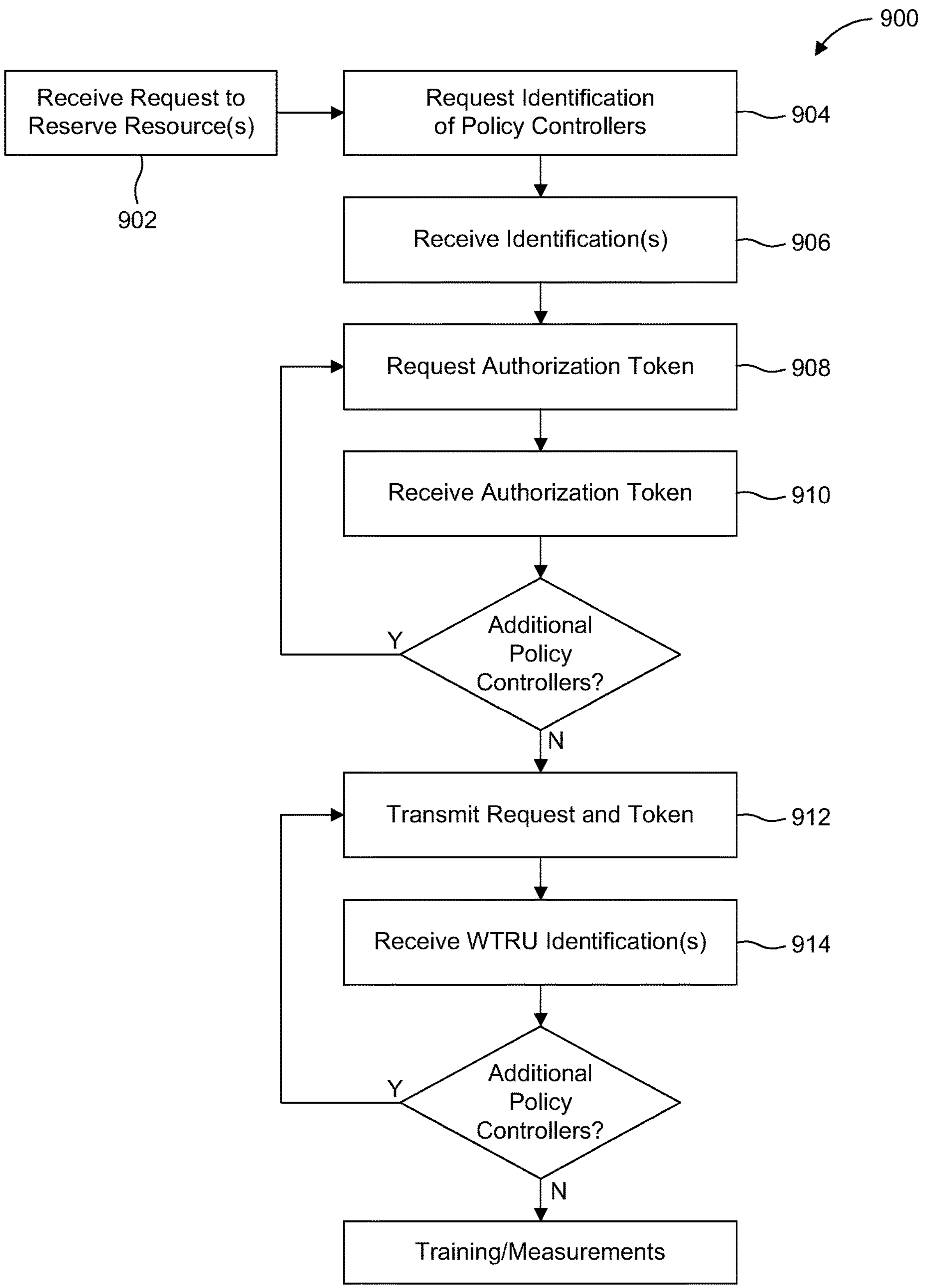
FIG. 9 shows an example procedure for dynamic policy management by a network exposure function node, according to some embodiments.

FIG. 9 shows an example procedure 900 for dynamic policy management by a network exposure function node, according to some embodiments. In some implementations, procedure 900 may be performed by a device, such as a WTRU, UE, server, or any other type and form of computing device acting as an AF node. In some implementations, the device or AF node may perform an AI/ML training procedure for QoS policy management using measurements obtained by one or more WTRUs or UEs in the network. As discussed above, the device or AF node may not necessarily be a trusted node, and accordingly, in some embodiments, another node may act as an intermediary or provide a network exposure function (NEF) for the AF node.

At 902, a first network node providing an exposure function (e.g. an NEF) may receive, from a second network node not identified as trusted (e.g. an AF), a request to reserve resources for a quality of service (QoS) training session, the request including performance requirements for the training session. In some embodiments, the request may include an authorization token obtained from a CAPIF as discussed above, or may include other authentication information (username, password, device identifier, public key, signed transaction, etc.). In some embodiments, the request may include an identification of one or more UEs to be utilized for the training session. In other embodiments, the request may include an identification of parameters for the training session, such as a number of UEs to be selected, a minimum bandwidth, a type of device, a geographic region, or any other such parameters for the training session or test. In some embodiments, the request may comprise an Nnef_GroupAFsessionWithQoS_Create request.

At 904, the first network node may request, from a third network node providing binding support management (e.g. a BSF node), an identification of one or more policy controllers (e.g. PCF nodes) associated with a subgroup of one or more wireless transmit/receive units (WTRUs) or UEs selected from a plurality of WTRUS or UEs for the QoS training session. The request may include parameters for the training session or test as discussed above. In some embodiments, the request may comprise an Nbsf_Management_Discovery request. Receipt of the request may cause the third network node (e.g. BSF node) to select one or more policy controllers that are associated with UEs or WTRUs that will be included in the training set.

At 906, the first network node may receive, from the third network node, a response identifying the one or more policy controllers. The response may be an Nbsf_Management_Discovery response.

At 908, the first network node may request, from a fourth network node providing a network repository function (e.g. NRF node), an authorization token for each of the one or more policy controllers. The request may comprise an identification of the one or more policy controllers identified by the BSF node. In some embodiments, the request may comprise an identification of the AF node. The fourth network node (e.g. NRF node) may generate an authorization token for each policy controller identified in the request (e.g. a plurality of tokens for a corresponding plurality of controllers).

At 910, the first network node may receive, from the fourth network node, one or more authorization tokens corresponding to the one or more policy controllers, each authorization token comprising an identification of the respective policy controller, the second network node, and an expiration time for the QoS training session. In some embodiments, each authorization token may include an identifier of the corresponding policy controller. In some embodiments, each authorization token may include an expiration time or date. Steps 908-910 may be performed iteratively for each policy controller or authorization token, or may be performed in a single step requesting and receiving a plurality of authorization tokens.

At 912, the first network node may transmit, to each policy controller of the one or more policy controllers, a request comprising the respective authorization token of the one or more authorization tokens and the performance requirements for the training session. The request may comprise an Npcf_PolicyAuthorization_Create request, in some embodiments. The request may comprise an identification of the AF node in some embodiments. The request may comprise an identification of one or more UEs or WTRUs associated with the policy controller.

At 914, the first network node may receive, from each policy controller, an identification of WTRUs of the subgroup which meet the performance requirements for the training session, the first network node providing the identification of WTRUs of the subgroup to the second network node. The response may comprise an Npcf_PolicyAuthorization_Create response. In some embodiments, the response may comprise an identification of one or more UEs or WTRUs associated with the policy controller. Steps 912-914 may be performed iteratively for each policy controller, or maybe performed in parallel (e.g. transmitting a plurality of requests, and receiving responses as each policy controller processes the corresponding request). In some embodiments, the first network node may provide access to network measurements and device parameters for UEs or WTRUs to the AF as discussed above (e.g. forwarding policy change subscription requests, forwarding measurements or QoS parameters, etc.).

Figure 10:
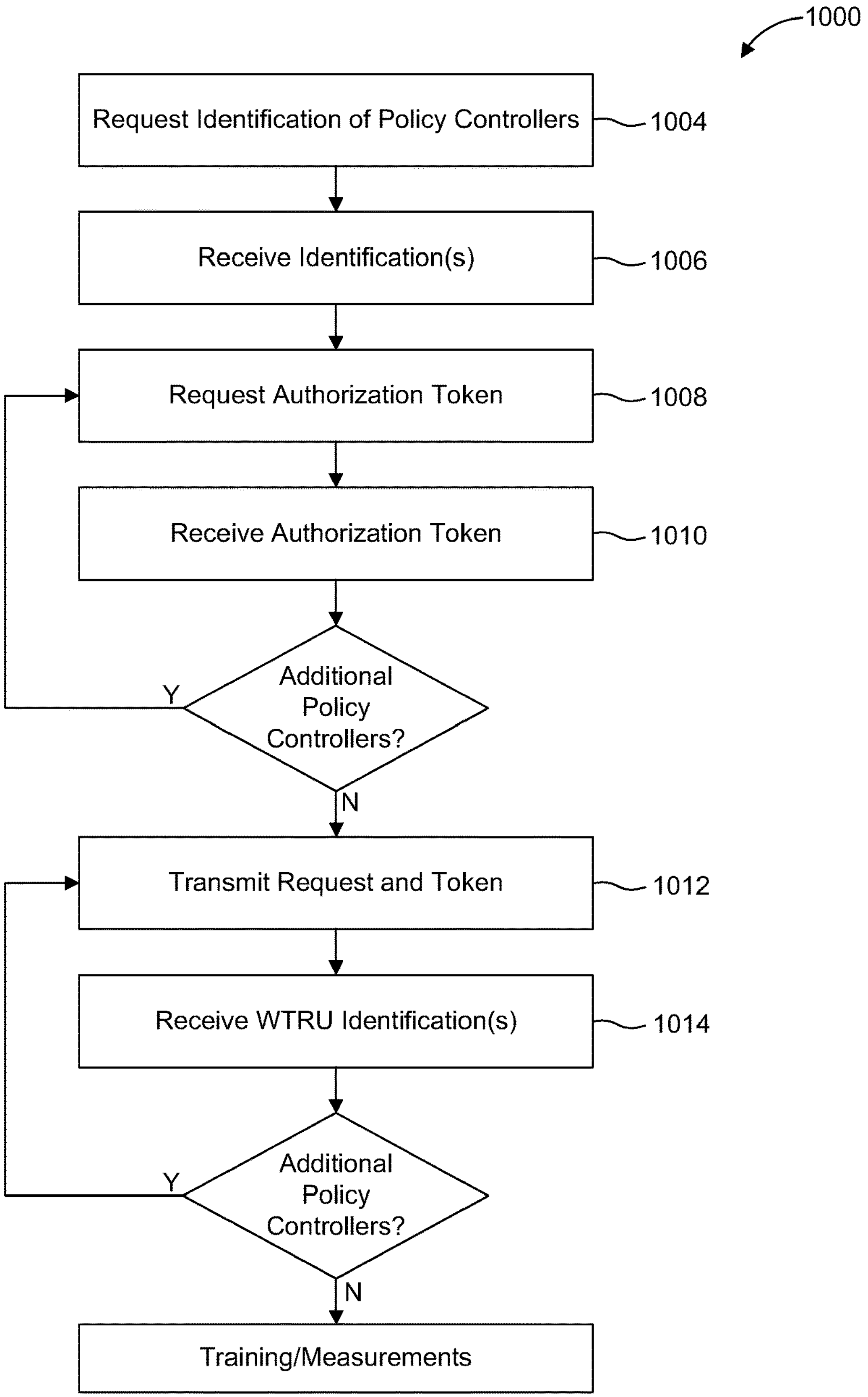
FIG. 10 shows another example procedure for dynamic policy management by an application function node, according to some embodiments.

FIG. 10 shows another example procedure 1000 for dynamic policy management by an application function node, according to some embodiments. Similar to procedure 900, procedure 1000 may be implemented for trusted AF nodes, in some embodiments.

At 1004, a first network node (e.g. an application function or AF node or other network device) may transmit a request to a second network node providing binding support management (e.g. a BSF node), an identification of one or more policy controllers associated with a subgroup of one or more wireless transmit/receive units (WTRUs) selected from a plurality of WTRUs for a QoS training session. In some embodiments, the AF node may select the WTRUs or UEs to be used for the QoS training session. In other embodiments, the AF node may provide requirements (e.g. device types, numbers of devices, geographic region, bandwidth, or any other such parameters). In some embodiments, the request may comprise an Nbsf_Management_Discovery request.

At 1006, the first network node may receive, from the second network node, a response identifying the one or more policy controllers. As discussed above, the response may comprise an Nbsf_Management_Discovery response.

At 1008, the first network node may request, from a third network node providing a network repository function, an authorization token for each of the one or more policy controllers. The request may comprise identifications of the first network node, the policy controllers, and/or the associated WTRUs or UEs; an expiration time or date; an access authorization or token received from a CAPIF, or any other such information.

At 1010, the first network node may receive, from the third network node, one or more authorization tokens corresponding to the one or more policy controllers, each authorization token comprising an identification of the respective policy controller, the first network node, and an expiration time for the QoS training session. As discussed above, the authorization tokens may be sent together, or steps 1008 and 1010 may be repeated for each additional policy controller.

At 1012, the first network node may transmit, to each policy controller of the one or more policy controllers, a request comprising the respective authorization token of the one or more authorization tokens and the performance requirements for the training session. As discussed above, the performance requirements may comprise bandwidth requirements, a number of devices or WTRUs to include in the session, a geographic region or regions, device types, or any other type and form of parameters or requirements.

At 1014, in some embodiments, the first network node may receive, from each policy controller, an identification of WTRUs of the subgroup which meet the performance requirements for the training session. In some embodiments, the identification may comprise a list of identifiers, a list of device types, or any other such information. In some embodiments, steps 1012-1014 may performed iteratively for each additional policy controller. In other embodiments, multiple requests may be transmitted at step 1012, and the first network node may receive responses at step 1014 from each policy controller as they process the request.

Figure 11:
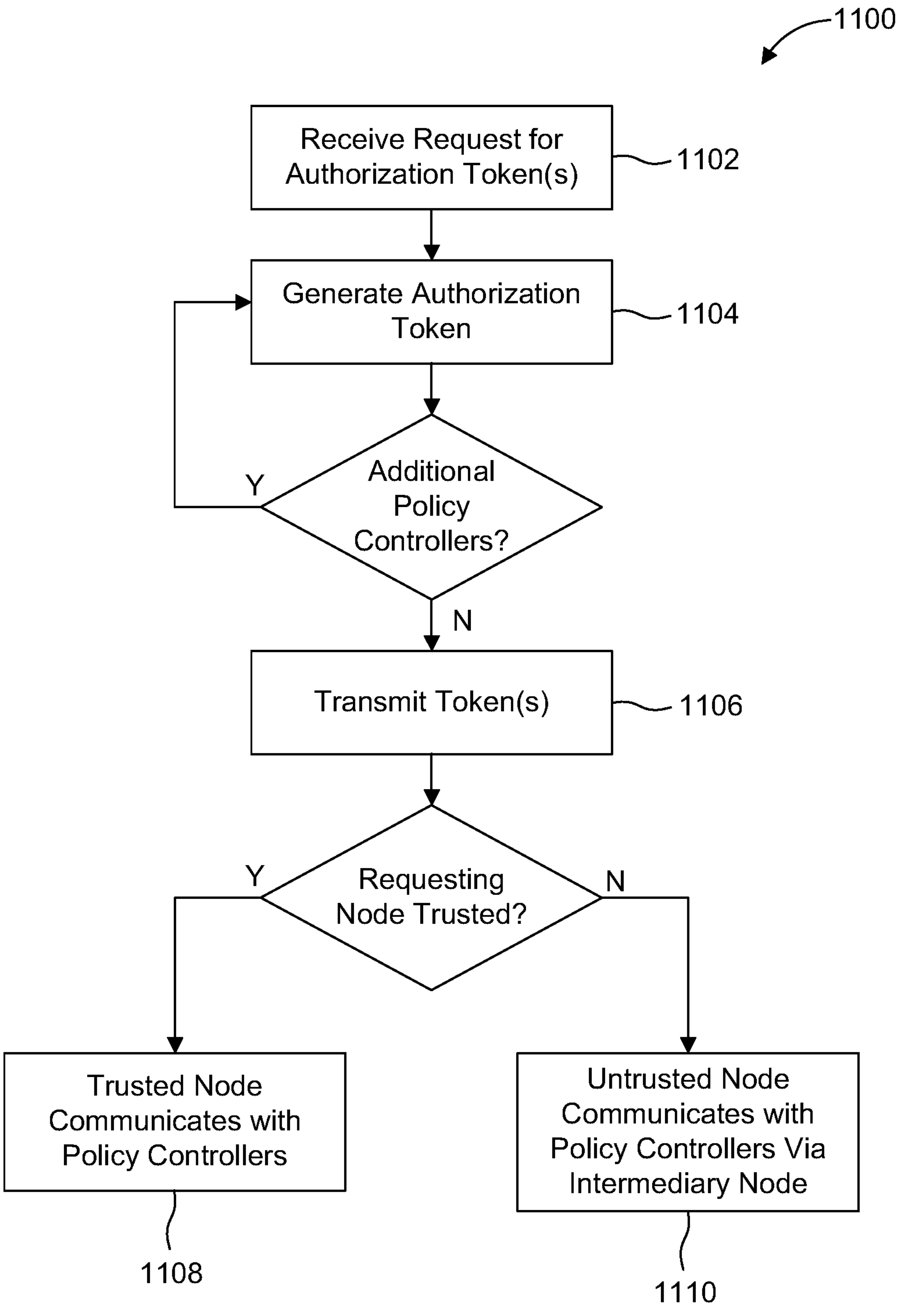
FIG. 11 shows another example procedure for dynamic policy management by a network repository function node, according to some embodiments.

FIG. 11 shows another example procedure 1100 for dynamic policy management by a network repository function node, according to some embodiments.

At 1102, a first network node providing a network repository function (e.g. NRF) may receive, from a requesting node (e.g. an AF node or an NEF node, etc.), a request for one or more authorization tokens corresponding to one or more policy controllers associated with a subgroup of one or more wireless transmit/receive units (WTRUs) selected from a plurality of WTRUs for a QoS training session. The request may be a request to reserve resources for access by a second network node (which may be the requesting node when the requesting node is the AF node, or a different node such as an AF node when the requesting node is an NEF node) for the QoS training session, the request comprising the identification of the second network node (e.g. the AF node). In some embodiments, the request may include an expiration time for the QoS training session.

At 1104, the first network node may generate one or more authorization tokens, each authorization token corresponding to a policy controller, and comprising an identification of the respective policy controller and an identification of the second network node. Step 1104 may be repeated for each additional policy controller. In some embodiments, each authorization token may comprise an identification of an expiration time for the token.

At 1106, the first network node may transmit, to the requesting node, the generated one or more authorization tokens.

In some embodiments, the requesting node is the second network node (e.g. AF node), and the second network node is identified as providing a trusted application function. In such embodiments, at 1108, the second network node may utilize the authorization tokens to communicate directly with the policy controllers (and/or the associated WTRUs or UEs). For example, in some implementations, receipt of the one or more authorization tokens causes the second network node to use the generated one or more authorization tokens to request identifications of the WTRUs of the subgroup from the policy controllers.

In some embodiments, the second network node (e.g. AF node) is not identified as providing a trusted application function, and the requesting node comprises a third network node providing an exposure function (e.g. NEF node) for the second network node. In such embodiments, at 1110, the third network node may use the generated one or more authorization tokens to request identifications of the WTRUs of the subgroup from the policy controllers and provide the identifications to the second network node. For example, in some such embodiments, the requesting node is deployed as or acts as an intermediary between the second network node and the one or more policy controllers.

In some embodiments, authorization tokens may be revoked or invalidated. For example, in some implementations such as where a token does not include an expiration time, or if the token is revoked or invalidated prior to any expiration time included in the token, the NRF node may transmit, to each of the one or more policy controllers for which an authorization token has been generated and is to be revoked, an identification that the corresponding authorization token has expired or been revoked. Such identifications may include a session identifier, an identifier of an AF or NEF node, or any other such information. In a similar implementation, the NRF node may transmit an identification that one or more authorization tokens have been expired or revoked to an AF node or NEF node or any other such device.

Accordingly, the present disclosure is directed to systems and methods for dynamic policy management in a wireless network environment. In a first aspect, a method for dynamic policy management includes identifying, by a first network node providing a network repository function in response to a communication from a requesting node, one or more policy controllers associated with a subgroup of one or more wireless transmit/receive units (WTRUs) selected from a plurality of WTRUs for an artificial intelligence/machine learning (AI/ML) training session. The method includes generating, by the first network node, one or more authorization tokens, each authorization token corresponding to a policy controller, and comprising an identification of the respective policy controller and an identification of a second network node. The method also includes transmitting, by the first network node to the requesting node, the generated one or more authorization tokens.

In some embodiments, the method includes receiving, by the first network node from the requesting node, the communication comprising a request to reserve resources for access by a second network node for the AI/ML training session, the request comprising the identification of the second network node. In a further embodiment, the request further comprises an expiration time for validity of the authorization token.

In some embodiments, each authorization token further comprises an identification of an expiration time for validity of the token. In some embodiments, the requesting node comprises the second network node, and the second network node is identified as providing a trusted application function; and transmitting the generated one or more authorization tokens to the requesting node causes the second network node to use the generated one or more authorization tokens to request identifications of the WTRUs of the subgroup from the policy controllers.

In some embodiments, the second network node is not identified as providing a trusted application function, and the requesting node comprises a third network node providing an exposure function for the second network node; and transmitting the generated one or more authorization tokens to the requesting node causes the third network node to use the generated one or more authorization tokens to request identifications of the WTRUs of the subgroup from the policy controllers and provide the identifications to the second network node. In a further embodiment, the requesting node is deployed as an intermediary between the second network node and the one or more policy controllers.

In some embodiments, the method includes subsequently transmitting, by the first network node to each of the one or more policy controllers, an identification that the corresponding authorization token has expired or been revoked. In some embodiments, the method includes subsequently transmitting, by the first network node to the requesting node, an identification that the one or more authorization tokens have expired or been revoked.

In another aspect, the present disclosure is directed to a system for dynamic policy management in a wireless network environment. The system includes a first network node comprising one or more network interfaces and one or more processors. The one or more processors are configured to: identify, in response to a communication from a requesting node, one or more policy controllers associated with a subgroup of one or more wireless transmit/receive units (WTRUs) selected from a plurality of WTRUs for an artificial intelligence/machine learning (AI/ML) training session; generate one or more authorization tokens, each authorization token corresponding to a policy controller, and comprising an identification of the respective policy controller and an identification of a second network node; and transmit, to the requesting node, the generated one or more authorization tokens.

In some embodiments, the one or more processors are further configured to receive, from the requesting node, the communication comprising a request to reserve resources for access by a second network node for the AI/ML training session, the request comprising the identification of the second network node. In a further embodiment, the request further comprises an expiration time for validity of the authorization token. In some embodiments, each authorization token further comprises an identification of an expiration time for validity of the token.

In some embodiments, the requesting node comprises the second network node, and the second network node is identified as providing a trusted application function; and transmitting the generated one or more authorization tokens to the requesting node causes the second network node to use the generated one or more authorization tokens to request identifications of the WTRUs of the subgroup from the policy controllers.

In some embodiments, the second network node is not identified as providing a trusted application function, and the requesting node comprises a third network node providing an exposure function for the second network node; and transmitting the generated one or more authorization tokens to the requesting node causes the third network node to use the generated one or more authorization tokens to request identifications of the WTRUs of the subgroup from the policy controllers and provide the identifications to the second network node. In a further embodiment, the requesting node is deployed as an intermediary between the second network node and the one or more policy controllers.

In some embodiments, the one or more processors are further configured to transmit, to each of the one or more policy controllers, an identification that the corresponding authorization token has expired or been revoked. In some embodiments, the one or more processors are further configured to transmit, to the requesting node, an identification that the one or more authorization tokens have expired or been revoked.

In another aspect, the present disclosure is directed to a method for dynamic policy management in a wireless network environment. The method includes receiving, by a first network node providing an exposure function from a second network node not identified as trusted, a request to reserve quality of service (QoS) resources for an artificial intelligence/machine learning (AI/ML) training session, the request including performance requirements for the training session. The method also includes requesting, by the first network node from a third network node providing binding support management, an identification of one or more policy controllers associated with a subgroup of one or more wireless transmit/receive units (WTRUs) selected from a plurality of WTRUs for the AI/ML training session. The method also includes receiving, by the first network node from the third network node, a response identifying the one or more policy controllers. The method also includes requesting, by the first network node from a fourth network node providing a network repository function, an authorization token for each of the one or more policy controllers. The method also includes receiving, by the first network node from the fourth network node, one or more authorization tokens corresponding to the one or more policy controllers, each authorization token comprising an identification of the respective policy controller, the second network node, and an expiration time for validity of the authorization token. The method also includes transmitting, by the first network node to each policy controller of the one or more policy controllers, a request comprising the respective authorization token of the one or more authorization tokens and the performance requirements for the training session. The method also includes receiving, by the first network node from each policy controller, an identification of WTRUs of the subgroup which meet the performance requirements for the training session, the first network node providing the identification of WTRUs of the subgroup to the second network node.

In another aspect, the present disclosure is directed to a method for dynamic policy management in a wireless network environment. The method includes requesting, by a first network node from a second network node providing binding support management, an identification of one or more policy controllers associated with a subgroup of one or more wireless transmit/receive units (WTRUs) selected from a plurality of WTRUs for an artificial intelligence/machine learning (AI/ML) training session. The method also includes receiving, by the first network node from the second network node, a response identifying the one or more policy controllers. The method also includes requesting, by the first network node from a third network node providing a network repository function, an authorization token for each of the one or more policy controllers. The method also includes receiving, by the first network node from the third network node, one or more authorization tokens corresponding to the one or more policy controllers, each authorization token comprising an identification of the respective policy controller, the first network node, and an expiration time for validity of the authorization token. The method also includes transmitting, by the first network node to each policy controller of the one or more policy controllers, a request comprising the respective authorization token of the one or more authorization tokens and the performance requirements for the AI/ML training session. The method also includes receiving, by the first network node from each policy controller, an identification of WTRUs of the subgroup which meet the performance requirements for the training session.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for dynamic policy management in a wireless network environment performed by a first network node providing a network exposure function, the method comprising:

receiving, from a second network node providing an application function, a first request message comprising a request for resources for a quality of service (QoS) training session for the application function, the first request message indicating one or more wireless transmit/receive units (WTRUs) for the QoS training session;

sending, to a third network node providing binding support management, a discovery request message requesting identification of one or more policy control functions serving the one or more WTRUs for the QoS training session;

receiving, from the third network node, a discovery response message indicating identifications of the one or more policy control functions serving the one or more WTRUs;

sending, to one or more network nodes providing the one or more policy control functions, a second request message to request authorization for the QoS training session for the application function for the one or more WTRUs;

receiving, from the one or more network nodes providing the one or more policy control functions, one or more response messages with policy authorization results for each of the one or more WTRUs; and sending to the second network node providing the application function, a QoS create response message identifying one or more of the one or more WTRUs for which the request for resources for the QoS training session for the application function are granted according to the policy authorization results.

2. The method of claim 1 further comprising:

sending to a fourth network node providing a network repository function, an authorization token request message requesting an authorization token for each of the one or more policy control functions; and receiving, from the fourth network node, one or more authorization tokens corresponding to the one or more policy control functions, each authorization token comprising an identification of the respective policy control function, an identification of the first network node, and an expiration time for validity of the authorization token, wherein the second request message further includes the authorization tokens.

3. The method of claim 1, wherein the QoS training session is an artificial intelligence machine learning (AIML) training session.

4. The method of claim 1, wherein the first request message comprises one or more of the following: one or more authorization tokens, an application function identifier for the application function, one or more flow descriptions, one or more external application identifiers, QoS reference information, a data network name (DNN), Single Network Slice Selection Assistance Information (S-NSSAI), artificial intelligence machine learning (AIML) group information, or AIML group performance information.

5. The method of claim 1 further comprising:

authorizing and assigning a transaction reference identifier to the received request for resources for the QoS training session for the application function.

6. The method of claim 5, wherein the authorizing the received request for resources for the QoS training session for the application function is based on a token received from a common application programming interface (API) framework (CAPIF) Core function.

7. The method of claim 5 further comprising:

applying policies to control an overall amount of QoS authorized for the QoS training session for the application function.

8. The method of claim 1, wherein the discovery request message comprises addresses of the one or more WTRUs.

9. The method of claim 1, wherein the second request message comprises one or more of the following: addresses of the one or more WTRUs, an application function identifier for the application function, one or more flow descriptions, artificial intelligence machine learning (AIML) group information, AIML group performance information, or an AIML session indicator.

10. The method of claim 1, wherein one or more second request messages are sent corresponding to the one or more policy control functions.

11. A first network node providing a network exposure function, the first network node comprising:

a transceiver; and a processor, wherein the transceiver and the processor are configured to:

receive, from a second network node providing an application function, a first request message comprising a request for resources for a quality of service (QOS) training session for the application function, the first request message indicating one or more wireless transmit/receive units (WTRUs) for the QoS training session;

send, to a third network node providing binding support management, a discovery request message requesting identification of one or more policy control functions serving the one or more WTRUs for the QoS training session;

receive, from the third network node, a discovery response message indicating identifications of the one or more policy control functions serving the one or more WTRUs;

send, to one or more network nodes providing the one or more policy control functions, a second request message to request authorization for the QoS training session for the application function for the one or more WTRUs;

receive, from the one or more network nodes providing the one or more policy control functions, one or more response messages with policy authorization results for each of the one or more WTRUs; and send, to the second network node providing the application function, a QoS create response message identifying one or more of the one or more WTRUs for which the request for resources for the QoS training session for the application function are granted according to the policy authorization results.

12. The first network node of claim 11, wherein the transceiver and the processor are further configured to:

send, to a fourth network node providing a network repository function, an authorization token request message requesting an authorization token for each of the one or more policy control functions; and receive, from the fourth network node, one or more authorization tokens corresponding to the one or more policy control functions, each authorization token comprising an identification of the respective policy control function, an identification of the first network node, and an expiration time for validity of the authorization token, wherein the second request message further includes the authorization tokens.

13. The first network node of claim 11, wherein the QoS training session is an artificial intelligence machine learning (AIML) training session.

14. The first network node of claim 11, wherein the first request message comprises one or more of the following: one or more authorization tokens, an application function identifier for the application function, one or more flow descriptions, one or more external application identifiers, QoS reference information, a data network name (DNN), Single Network Slice Selection Assistance Information (S-NSSAI), artificial intelligence machine learning (AIML) group information, or AIML group performance information.

15. The first network node of claim 11, wherein the transceiver and the processor are further configured to:

authorize and assign a transaction reference identifier to the received request for resources for the QoS training session for the application function.

16. The first network node of claim 15, wherein the received request for resources for the QoS training session for the application function is authorized based on a token received from a common application programming interface (API) framework (CAPIF) Core function.

17. The first network node of claim 15, wherein the transceiver and the processor are further configured to:

apply policies to control an overall amount of QoS authorized for the QoS training session for the application function.

18. The first network node of claim 11, wherein the discovery request message comprises addresses of the one or more WTRUs.

19. The first network node of claim 11, wherein the second request message comprises one or more of the following: addresses of the one or more WTRUs, an application function identifier for the application function, one or more flow descriptions, artificial intelligence machine learning (AIML) group information, AIML group performance information, or an AIML session indicator.

20. The first network node of claim 11, wherein one or more second request messages are sent corresponding to the one or more policy control functions.

* * * * *